(12) United States Patent
Cummings et al.

(10) Patent No.: US 11,545,931 B2
(45) Date of Patent: Jan. 3, 2023

(54) OPTIMIZING HYBRID INVERTER SYSTEM

(71) Applicant: MaxOut Renewables, Inc., Livermore, CA (US)

(72) Inventors: Eric Bryant Cummings, Livermore, CA (US); Kirsten Kaye Pace, Livermore, CA (US)

(73) Assignee: MaxOut Renewables, Inc., Livermore, CA (US)

( * ) Notice: Subject to any disclaimer, the term of this patent is extended or adjusted under 35 U.S.C. 154(b) by 0 days.

(21) Appl. No.: 17/094,202

(22) Filed: Nov. 10, 2020

(65) Prior Publication Data

US 2021/0143774 A1 May 13, 2021

Related U.S. Application Data

(60) Provisional application No. 62/933,494, filed on Nov. 10, 2019.

(51) Int. Cl.
*H02S 40/32* (2014.01)
*H02S 40/34* (2014.01)
(Continued)

(52) U.S. Cl.
CPC .............. *H02S 40/32* (2014.12); *H01H 3/26* (2013.01); *H01M 10/425* (2013.01);
(Continued)

(58) Field of Classification Search
CPC ........ H02S 40/32; H02S 40/345; H02S 40/36; H02S 40/38; H02S 40/34; H01H 3/26;
(Continued)

(56) References Cited

U.S. PATENT DOCUMENTS

| 4,186,336 A | 1/1980 | Weinberg et al. |
| 4,333,136 A | 6/1982 | Baker et al. |

(Continued)

FOREIGN PATENT DOCUMENTS

| CN | 1271207 | 10/2000 |
| CN | 1794537 | 6/2006 |

(Continued)

OTHER PUBLICATIONS

U.S. Appl. No. 16/232,888, Notice of Allowance, dated Jun. 24, 2020, 8 pages.

(Continued)

*Primary Examiner* — Robert L Deberadinis
(74) *Attorney, Agent, or Firm* — Kilpatrick Townsend & Stoctkon LLP

(57) ABSTRACT

The present invention relates to resiliency in photovoltaically produced power generation and utilization. This invention comprises a system of elements that combine to minimize the cost and complexity of a backup-capable solar power system. An element of this system is a prior-art balancer-based photovoltaic panel power optimizer whose power electronics are time-shared to allow an array of battery modules to power or provide supplemental or surge power to an inverter. Further elements of the system provide for rapid and low-cost installation, reliability, and easy and safe maintenance.

5 Claims, 13 Drawing Sheets

(51) Int. Cl.
| | |
|---|---|
| *H02J 7/00* | (2006.01) |
| *H01M 10/42* | (2006.01) |
| *H02J 3/38* | (2006.01) |
| *H02S 40/38* | (2014.01) |
| *H02S 40/36* | (2014.01) |
| *H02J 7/35* | (2006.01) |
| *H01H 3/26* | (2006.01) |

(52) U.S. Cl.
CPC .............. *H02J 3/381* (2013.01); *H02J 7/007* (2013.01); *H02J 7/0024* (2013.01); *H02J 7/35* (2013.01); *H02S 40/345* (2014.12); *H02S 40/36* (2014.12); *H02S 40/38* (2014.12); *H01M 2010/4271* (2013.01); *H02J 2300/26* (2020.01)

(58) Field of Classification Search
CPC ....... H01M 10/425; H01M 2010/4271; H01M 10/42; H02J 3/381; H02J 3/38; H02J 7/0024; H02J 7/007; H02J 7/35; H02J 2300/26; H02J 7/00
See application file for complete search history.

(56) References Cited

U.S. PATENT DOCUMENTS

| | | | |
|---|---|---|---|
| 4,604,567 | A | 8/1986 | Chetty |
| 5,592,074 | A | 1/1997 | Takehara et al. |
| 6,259,234 | B1 | 7/2001 | Perol |
| 6,262,558 | B1 | 7/2001 | Weinberg |
| 7,046,531 | B2 | 5/2006 | Zocch et al. |
| 7,324,361 | B2 | 1/2008 | Siri et al. |
| 7,471,014 | B2 | 12/2008 | Lum et al. |
| 8,138,631 | B2 | 3/2012 | Allen et al. |
| 8,233,278 | B2 | 7/2012 | Hoffman et al. |
| 8,786,139 | B2 | 7/2014 | Cummings |
| 8,860,246 | B2 | 10/2014 | Ardit et al. |
| 9,136,703 | B2 | 9/2015 | Cummings |
| 9,136,704 | B2 | 9/2015 | Cummings |
| 10,381,918 | B1 | 8/2019 | Stoichita et al. |
| 10,833,599 | B2 | 11/2020 | Cummings |
| 2002/0113534 | A1 | 8/2002 | Hayashi et al. |
| 2003/0197245 | A1 | 10/2003 | Zhang |
| 2005/0121067 | A1 | 6/2005 | Toyomura et al. |
| 2006/0055366 | A1 | 3/2006 | Tsunetsugu et al. |
| 2007/0159866 | A1 | 7/2007 | Siri |
| 2007/0240000 | A1 | 10/2007 | Chapuis et al. |
| 2008/0143188 | A1 | 6/2008 | Adest et al. |
| 2008/0144294 | A1 | 6/2008 | Adest et al. |
| 2008/0150484 | A1 | 6/2008 | Kimball et al. |
| 2008/0164766 | A1 | 7/2008 | Adest et al. |
| 2008/0174955 | A1 | 7/2008 | Eddy et al. |
| 2008/0236648 | A1 | 10/2008 | Klein et al. |
| 2008/0266922 | A1 | 10/2008 | Mumtaz et al. |
| 2008/0283118 | A1 | 11/2008 | Rotzoll et al. |
| 2008/0285317 | A1 | 11/2008 | Rotzoll et al. |
| 2009/0284078 | A1 | 11/2009 | Zhang et al. |
| 2009/0302681 | A1 | 12/2009 | Yamada et al. |
| 2009/0302686 | A1 | 12/2009 | Fishman et al. |
| 2010/0079955 | A1 | 4/2010 | Li et al. |
| 2010/0127571 | A1 | 5/2010 | Hadar et al. |
| 2010/0157632 | A1 | 6/2010 | Batten et al. |
| 2010/0253151 | A1 | 10/2010 | Gerhardinger et al. |
| 2010/0295383 | A1 | 11/2010 | Cummings |
| 2011/0089763 | A1 | 4/2011 | Svensson et al. |
| 2012/0049635 | A1 | 3/2012 | Schelen et al. |
| 2013/0249319 | A1* | 9/2013 | Cummings ......... H02M 1/0043 307/131 |
| 2014/0319916 | A1 | 10/2014 | Cummings |
| 2014/0319917 | A1 | 10/2014 | Cummings |
| 2014/0321057 | A1 | 10/2014 | Cummings |
| 2016/0028174 | A1 | 1/2016 | Jung |
| 2016/0126032 | A1 | 5/2016 | Sihler et al. |
| 2016/0342546 | A1 | 11/2016 | Sonnaillon |

FOREIGN PATENT DOCUMENTS

| | | |
|---|---|---|
| CN | 1902789 | 1/2007 |
| CN | 1954484 | 4/2007 |
| CN | 101072976 | 11/2007 |
| CN | 101098112 | 1/2008 |
| CN | 101128974 | 2/2008 |
| CN | 201018313 | 2/2008 |
| CN | 102460338 | 5/2012 |
| CN | 102460338 | 8/2014 |
| CN | 104135217 | 11/2014 |
| CN | 104135218 | 11/2014 |
| CN | 104135219 | 11/2014 |
| EP | 1 2438 72 | 7/2008 |
| IN | 9410/CHENP/2011 | 2/2013 |
| WO | 2004006342 | 1/2004 |
| WO | 2007086472 | 8/2007 |
| WO | 2014149775 | 9/2014 |

OTHER PUBLICATIONS

U.S. Appl. No. 16/232,888, Final Office Action, dated Apr. 15, 2020, 9 pages.
U.S. Appl. No. 16/232,888, Non-Final Office Action, dated Oct. 2, 2019, 13 pages.
U.S. Appl. No. 11/843,549, "Office Action", dated Jan. 20, 2012, 11 pages.
U.S. Appl. No. 12/782,932, "Non-Final Office Action", dated Jun. 28, 2013, 13 Pages.
U.S. Appl. No. 12/782,932, "Notice of Allowance", dated Mar. 20, 2014, 9 pages.
U.S. Appl. No. 13/840,958, "Notice of Allowance", dated May 6, 2015, 11 pages.
U.S. Appl. No. 14/326,222, "Final Office Action", dated Aug. 14, 2015, 14 pages.
U.S. Appl. No. 14/326,222, "Non-Final Office Action", dated Dec. 26, 2014, 16 pages.
U.S. Appl. No. 14/326,222, "Notice of Allowance", dated Dec. 2, 2015, 5 pages.
U.S. Appl. No. 14/326,229, "Notice of Allowance", dated Mar. 28, 2016, 9 pages.
U.S. Appl. No. 14/326,229, "Restriction Requirement", dated Jan. 12, 2016, 6 pages.
U.S. Appl. No. 14/326,246, "Non-Final Office Action", dated Oct. 24, 2014, 9 pages.
U.S. Appl. No. 14/326,246, "Notice of Allowance", dated May 12, 2015, 9 pages.
U.S. Appl. No. 15/194,029, "Non-Final Office Action", dated Aug. 11, 2017, 11 pages.
U.S. Appl. No. 15/194,029, "Restriction Requirement", dated Apr. 25, 2017, 9 pages.
PCT/US2010/035368, "International Preliminary Report on Patentability", dated Dec. 1, 2011, 7 pages.
PCT/US2010/035368, "International Search Report and Written Opinion", dated Sep. 1, 2010, 10 pages.
PCT/US2014/020862, "International Search Report and Written opinion", dated Sep. 4, 2014, 7 Pages.

* cited by examiner

Fig. 1B
Fig. 1C
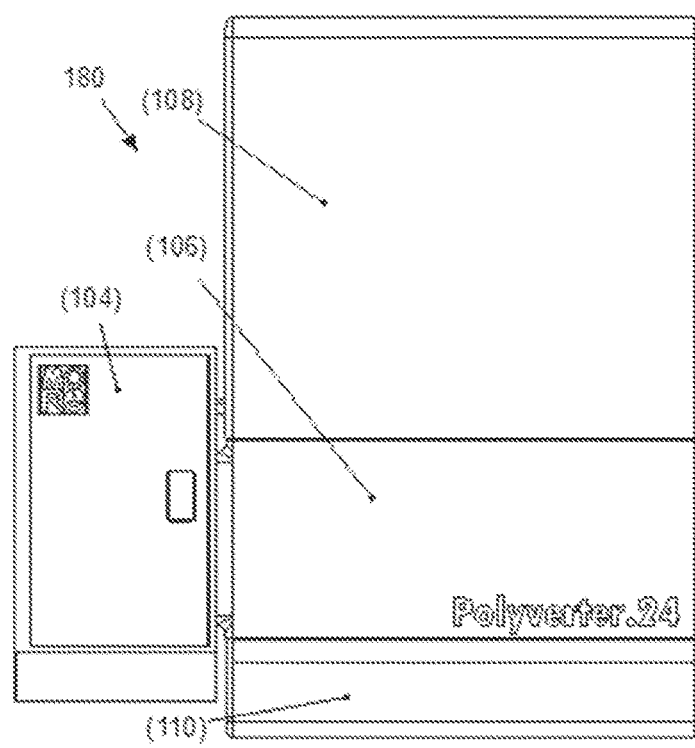
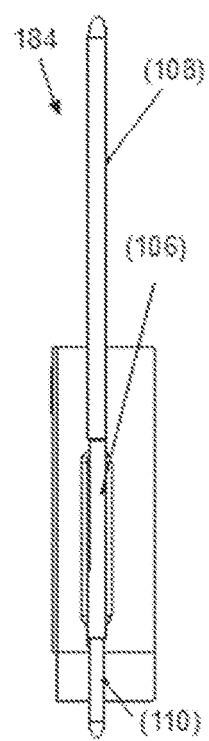
Fig. 1D
Fig. 1E
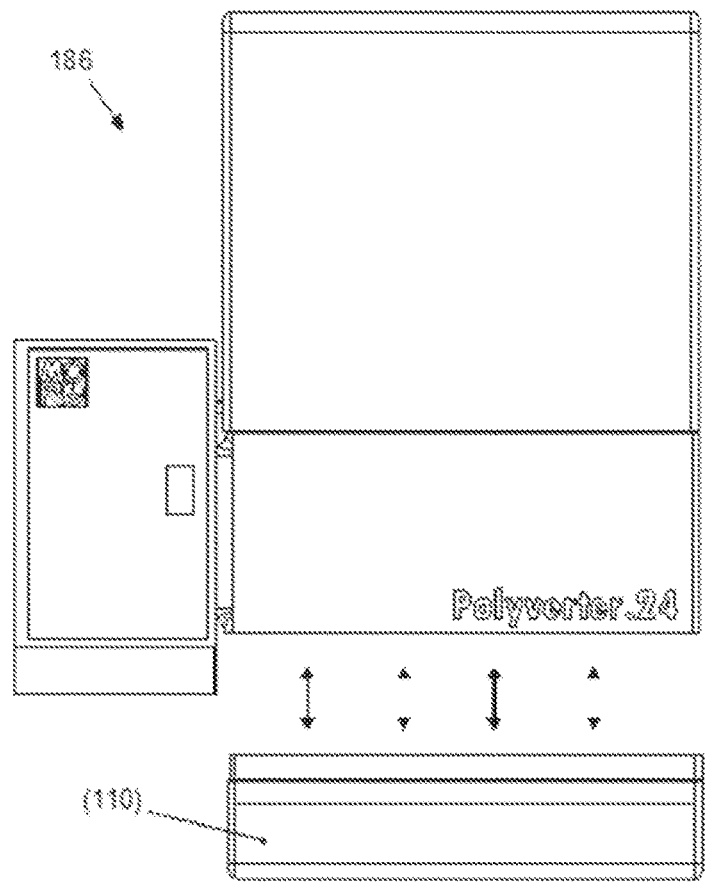
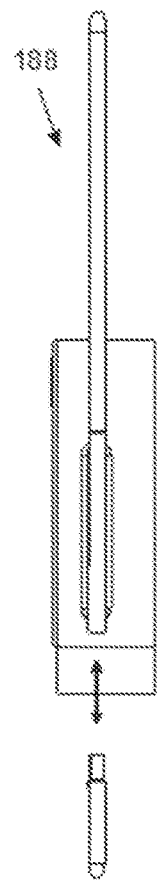

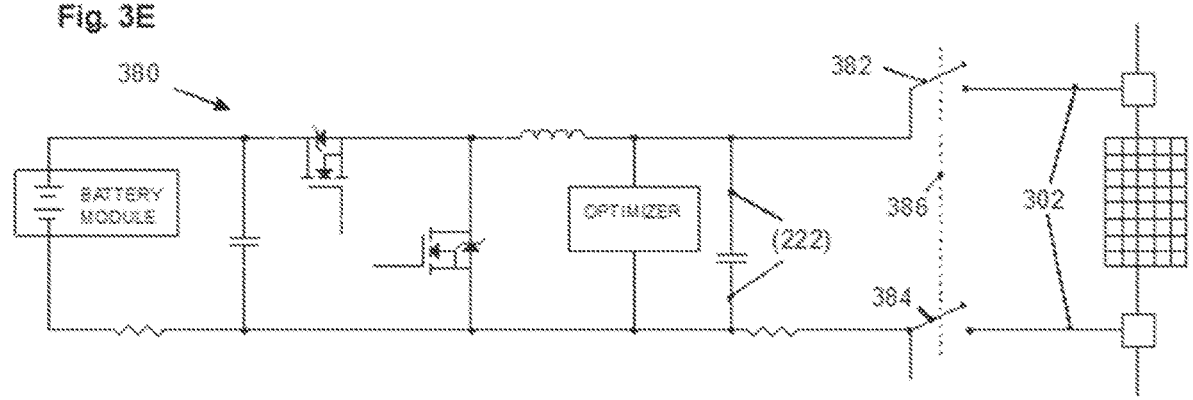
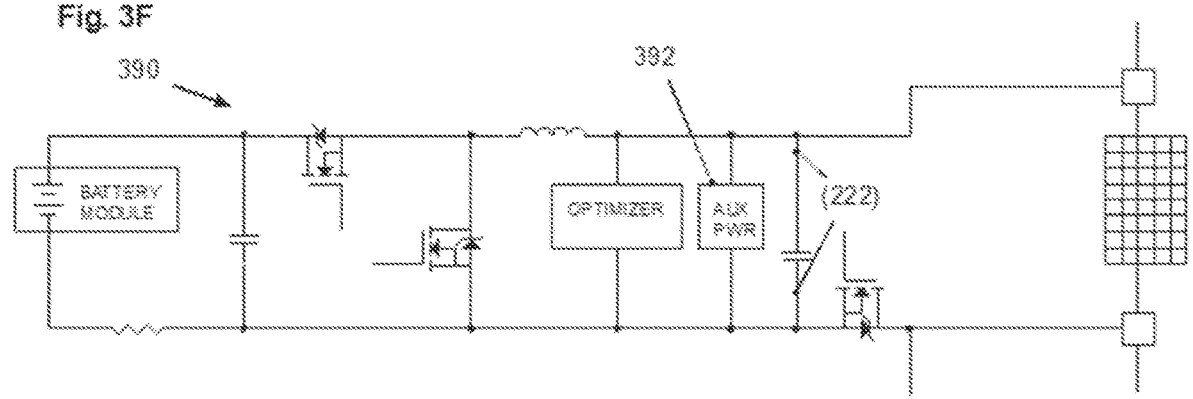

Fig. 7A
Fig. 7B
Fig. 7C
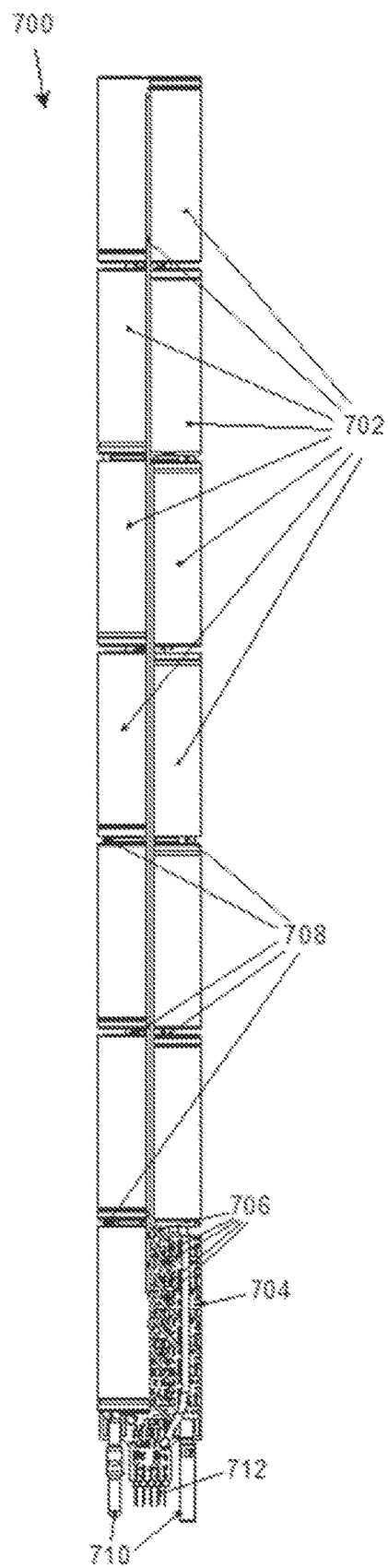
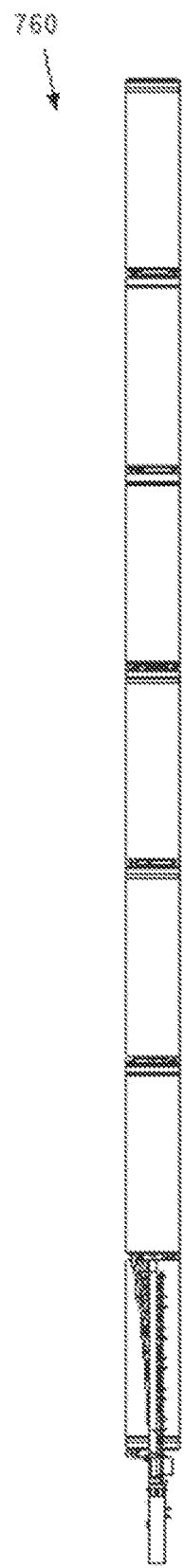
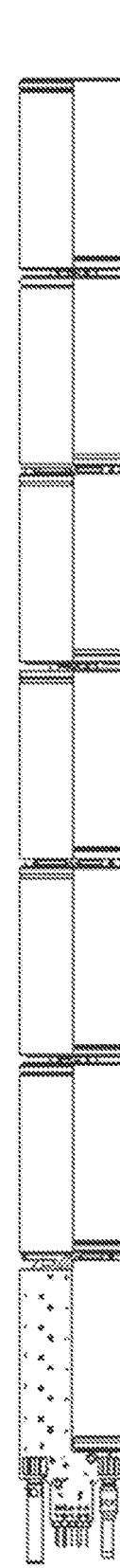

OPTIMIZING HYBRID INVERTER SYSTEM

CROSS-REFERENCES TO RELATED APPLICATIONS

This application claims the benefit of U.S. Provisional Patent Application No. 62/933,494, filed Nov. 10, 2019, the entire contents of which are incorporated herein by reference for all purposes.

BACKGROUND

String inverters have a limited ability to function as an uninterruptable power system because, with their fixed photovoltaic (PV) power and without substantial internal power storage, they often cannot supply surge power needed to start large appliances such as refrigerators and air conditioners. To solve this problem, some prior art inverters supplement PV power with battery-stored power to boost output. Some such inverter systems can store power during the day and provide it to the grid or a local load such as a household at a later time. It is also known in the art to implement an automatic transfer switch to an alternative power source such as an inverter or generator when the grid voltage is out of a specified range. It is known in the art that a local load will often comprise a number of subloads. Herein, a subload comprises one of a plurality of circuits connected in parallel to a power source. Subloads of different urgency or priority and choices must often be made as to what loads to power when grid power is not available.

In prior-art systems this prioritization is performed using a sub-panel that is connected to a statically determined priority subset of the subloads or power outlets. In some prior-art systems the sub-panel is connected to the main by an automatic transfer switch such that, when grid power is unstable or unavailable, only the subloads connected to the sub-panel are energized by the alternate power source. This arrangement has the drawback of requiring a static set of subloads and power outlets to be determined and wired. The installation and wiring of a subpanel for this purpose may entail undesirable hardware and labor costs. The limitation of a static set of subloads may entail undesirable complexity and limitations during an outage.

BRIEF DESCRIPTION OF THE DRAWINGS

FIG. 1B shows a front view of an embodiment of an assembled hybrid inverter according to various embodiments.

FIG. 1C shows a side view of the hybrid inverter according to various embodiments.

FIG. 1D shows a front view of an inverter during maintenance according to various embodiments.

FIG. 1E shows a side view of an inverter during maintenance according to various embodiments.

FIG. 3E shows a schematic diagram of a variant of a circuit according to various embodiments.

FIG. 3F shows a schematic diagram of a variant of a circuit according to various embodiments.

FIG. 7A shows a front view of a battery module according to various embodiments.

FIG. 7B shows a side view of a battery module according to various embodiments.

FIG. 7C shows a back view of a battery module according to various embodiments.

DETAILED DESCRIPTION

Figure 1A:
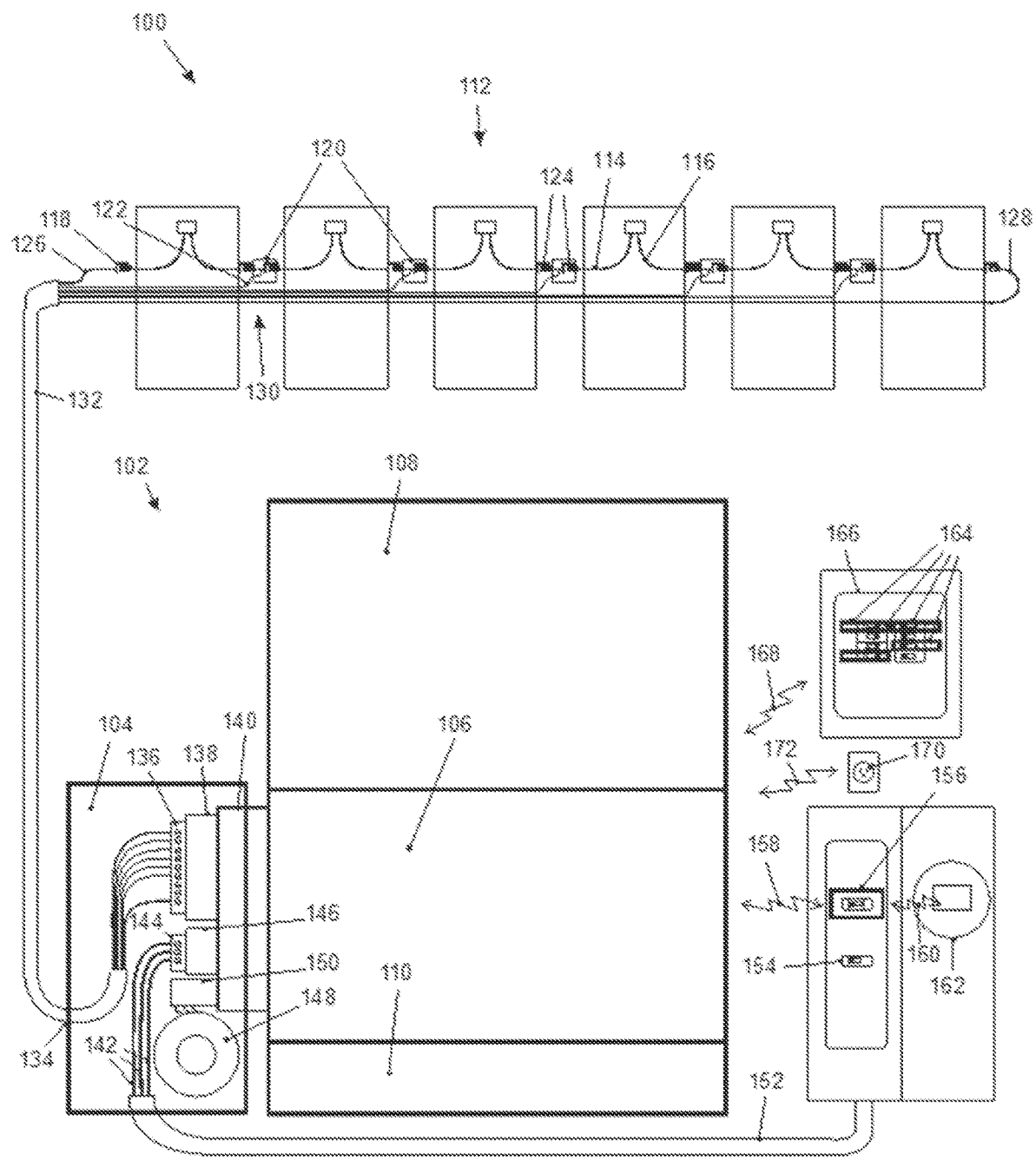
FIG. 1A shows a diagram of a complete hybrid inverter optimizer system according to various embodiments.

Herein a L1 is a current-carrying alternating current (AC) line, L2 is a second current-carrying AC line whose voltage is out of phase with that of L1. N is a current-carrying AC line, normally called a neutral line substantially at the average voltage of L1 and L2.

Where used, the neutral (N) power circuit is normally produced via induction in a generator or transformer. If the connection to this inductor is disconnected, a secondary means of establishing the neutral circuit may be necessary to insert into the power circuit. An autotransformer is commonly used to perform this function. In some embodiments of the present invention, an autotransformer is statically wired to L1, L2, and N. This arrangement has the advantage of simplicity, but presents a parasitic load, even when it is not needed in the circuit. Some embodiments of the present invention comprise a switch that makes and breaks an electrical connection to an inductor. In some embodiments the inductor is an auto-transformer. In some embodiments the switch is a 2-pole switch. In some embodiments, the poles switch L1 and L2, while N is statically connected to a center tap. In some embodiments, the poles switch either L1 or L2 and N, while the third circuit is statically connected to an outer terminal of autotransformer. In some embodiments the switch comprises a circuit breaker that trips based on one or more of: over-current, over-temperature, under-voltage, over-voltage, cycle frequency. In some embodiments, the switch is actuatable. In some embodiments, the switch comprises a circuit breaker on a main or sub-panel. In some embodiments the circuit breaker automation is performed by a motorized or solenoidally actuated switch interface disposed to exert switching force toward both the 'on' and 'off' position. In some embodiments, the switch interface contains an opening that is wide enough to allow a manual override of the switch position. In some embodiments, the switch interface does not allow a manual disconnect. This prohibition may protect against serious voltage faults if the autotransformer is switched off while there is no alternate means of establishing the neutral line. In some embodiments, the actuator of the switch comprises a switch microcontroller in digital or analog communication with a second microcontroller. In some embodiments, the switch microcontroller senses the position or acquisition state of the switch. In some embodiments, the switch microcontroller senses one of more of: voltage, current, position, magnetic field, electrostatic field. In some embodiments the switch microcontroller's sensing of switch state is an interlock signal required by a microcontroller, possibly the same microcontroller, to enable operation of an inverter. In some embodiments of the present invention, the autotransformer switch is electronic, e.g., a solid-state relay, MOSFET, BJT, IGBT, or other switch known in the art. In some embodiments the autotransformer switch is actuated automatically when improper voltage is detected between L1 or L2 and N. In some embodiments, the autotransformer is switched off automatically when the current in the neutral line is below a threshold for an interval of time. In some embodiments, the autotransformer switch may comprise a rapid-acting over-voltage detection device, such as a MOV, TVS, avalanche diode, discharge cell, etc. as known in the art to maintain safety for brief switch actuation periods and fault-detection latency. Some embodiments synchronize the actuation of the switch with one or more of the AC-cycle voltage waveform, inductor current waveform, magnetic field, etc. Such synchronization may reduce line transients produced by abrupt current changes. In some embodiments, the autotransformer and switch are integrated with an inverter.

In some embodiments, the autotransformer, switch, and communication means are housed in a separate enclosure. In some embodiments, one or more of these elements are housed in a statically installed, stationary component of a hybrid inverter system.

For safety, prior-art battery backup systems typically work at a battery voltage of 50 V or lower. This may have the disadvantage of requiring relatively expensive interconnect conductors. Such systems typically comprise paralleled batteries, which can result in non-ideal charge and discharge behavior for some batteries because of temperature, chemistry, age, or capacity differences. Some prior-art battery charge controllers employ a 'balancer' circuit to adapt the charge and discharge current to optimize each battery, but this arrangement may have the disadvantage of excessive cost.

Hybrid Inverter Optimizer

The present invention represents a comprehensive cost optimization of a solar-based uninterruptable power system that provides maximal flexibility to power subloads and outlets during an outage. The present invention comprises a PV string inverter as known in the art. In some embodiments, the string inverter is a massively interleaved inverter, featuring a high degree of power circuitry redundancy for fault tolerance. Some embodiments of the present invention further comprise a balancer having a bypass connection between at least two solar panels through which current may pass so as substantially to maximize the power harvest of more than one solar panel simultaneously. The conductor through with the current flows is herein called a 'bypass cable.'

FIG. 1A shows a diagram of a complete hybrid inverter optimizer system 100 according to an embodiment of the present invention. The hybrid inverter system 102 comprises a substantially statically mounted or stationary unit 104, a light-weight, power module 106 containing power-processing electronics, a gang 108 of battery modules, and a capacitor module 110. In some embodiments, high-reliability components and conventional electrician-installed components are housed in 104. Items that degrade over time such as batteries and electrolytic capacitors are respectively housed in removable modules 108 and 106. Power electronics, which may be susceptible to component failure, are housed in a removable module such that the mass of the componentry that must be replaced in the event of a loss of function is minimal. System 112 is a PV array. Elements 114 and 116 are respectively anode- (positive) and cathode- (negative) side PV-panel-mounted cables. Element 118 is a mated solar power connector, e.g., an MC4 connector as known in the art. Element 120 is a connector between both genders of a solar connector and a bypass cable 122. In some embodiments, the bypass cable 122 is permanently connected. In some embodiments the bypass cable is breakably connected. In some embodiments. The connector 120 further comprises one or more of the following in the connector contact region: a conductive paste, gel, powder, or grease, an anti-corrosion paste, gel, powder or grease, a water-proofing agent, a water gettering agent. Elements 126 and 128 are cables carrying the primary string current on the positive and negative side, respectively. System 130 is a bundle of DC bypass and primary cables leading from the photovoltaic array.

In some embodiments, this cable bundle is sheathed in a material 132 that may provide one or more of: insulation, UV-light-resistance, water resistance, fire protection, animal, insect, and plant resistance, impact, crushing, and abrasion protection, aesthetics, facilitated mounting to railing and structures, interior to exterior feedthroughs. Some embodiments comprise one or more of a mesh, metal, plastic, extrusion, clam-shell assembly, flexible assembly, tube, conduit. Some embodiments comprise an alternative means of bundling an array of cables.

Element 134 is a feedthrough into the stationary housing 104. Element 136 is a terminal block or breakable connector to the DC bundle 130. Element 138 is a link between the cable termini at 136 and feedthrough 140 to power module 106. At least one breakable connection exists between element 138 and 140 or 140 and 106 to facilitate servicing of the power module 106. Element 138 may further comprise one or more of: a switch, a rapid-shutdown shunt, a DC disconnect, mechanical and motion apparatus, circuit protection device.

Element 142 comprises AC circuits. In some embodiments these circuits are L1, L2, and N. Element 144 is a terminal block or breakable connection to the AC circuits. Element 146 links the connection 144 via feedthrough 140 to the power module 106. A breakable connection exists to facilitate removal of the power module for servicing or replacement. Element 146 may further comprise one or more of an AC disconnect switch, mechanical and motion apparatus, a circuit protection device.

Some embodiments further comprise a transformer or autotransformer 148 and link 150 to AC circuits. In some embodiments, 150 further comprises a static or automatable switch or relay to make and break connections to AC circuits. Element 152 is a conduit or cable to a power panel, e.g., a circuit breaker 154 on a main panel. In some embodiments, element 152 connects to a subpanel directly or through a circuit breaker.

Some embodiments of the present invention can provide backup power in the event of a grid outage. To avoid back-powering the grid some embodiments further comprise a switch automator or switch-position sensor 156. In some embodiments, 156 is installed over a service disconnect switch. In some embodiments, 156 is in communication (158) with a controller in the hybrid inverter. In some embodiments, 156 is in communication (160) with a smart meter (162). In some embodiments, communication is wireless; in some embodiments it is wired. In some embodiments, 156 further comprises a circuit that detects grid voltage and frequency even when the service disconnect switch is open.

Some embodiments of the present invention further comprise at least one switch automator 164 installed over a circuit breaker in a power panel or sub-panel 166. In some embodiments 164 communicates with a controller over a wired or wireless communications link 168. Some embodiments dynamically control loads by actuating one or more breaker.

Some embodiments of the present invention further comprise at least one 'smart outlet' 170 that communicates with a controller via a wired or wireless communications link 172. Some embodiments dynamically control loads by sending commands to one or more smart outlet. Some embodiments further diagnose whether one or more circuit is drawing excessive current by receiving data from one or more smart outlets.

FIG. 1B shows a front view 180 of an embodiment of an assembled hybrid inverter, comprising stationary, statically-installed module 104, power module 106, battery module assembly 108, and capacitor module assembly 110, according to an embodiment of the present invention. FIG. 1C shows a side view 184 of the hybrid inverter embodiment. The heat-generating elements 106, 108, and 110 are disposed as a slender 'cooling fin' for maximally material efficient heat transfer to ambient.

FIGS. 1D and 1E respectively show front (186) and side (188) views of an inverter embodiment during maintenance, in which the capacitor module assembly 110 is detached from the power module.

Figure 1F:
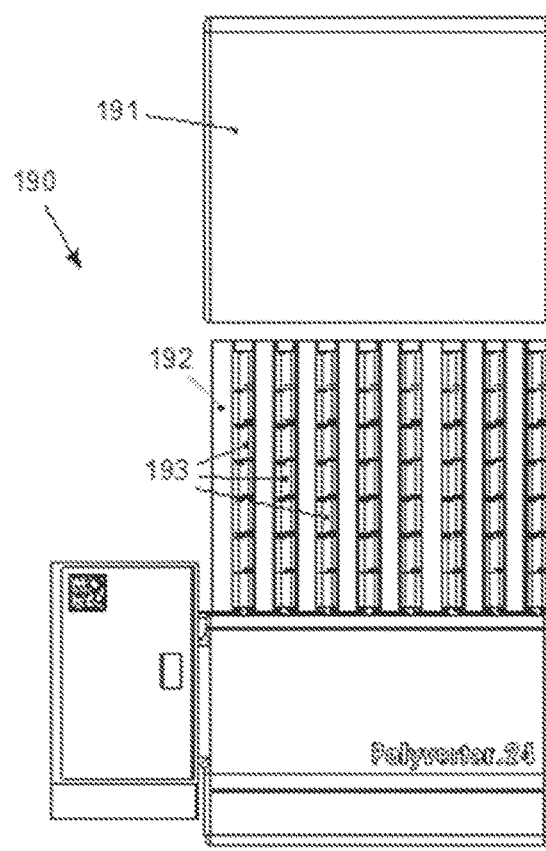
FIG. 1F shows a front view of an inverter during maintenance according to various embodiments.
Figure 1G:
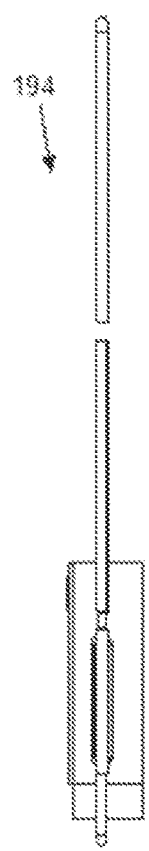
FIG. 1G shows a side view of an inverter during maintenance according to various embodiments.

FIGS. 1F and 1G respectively show front (190) and side (194) views of an inverter embodiment during maintenance, in which a battery module assembly shroud 191 is detached, revealing a physical battery isolator 192 and array of battery modules 193. Some embodiments of physical battery isolators comprise a material that may prevent a battery fire from spreading from one module to an adjacent one. In some embodiments this isolator is an array of tubes or channels in which the battery modules are inserted. In some embodiments, this isolator is a corrugated structure wherein battery modules are nested in the corrugations. In some embodiments, battery modules are nested in corrugations on both sides of the corrugation. In some embodiments, this isolator is made from one or more of: steel, aluminum, fiberglass, epoxy, a UL94V-rated plastic, a ceramic, a composite, a lamination. In some embodiments this battery isolator further comprises a stationary, statically installed structural skeleton for enhanced rigidity.

Figure 1H:
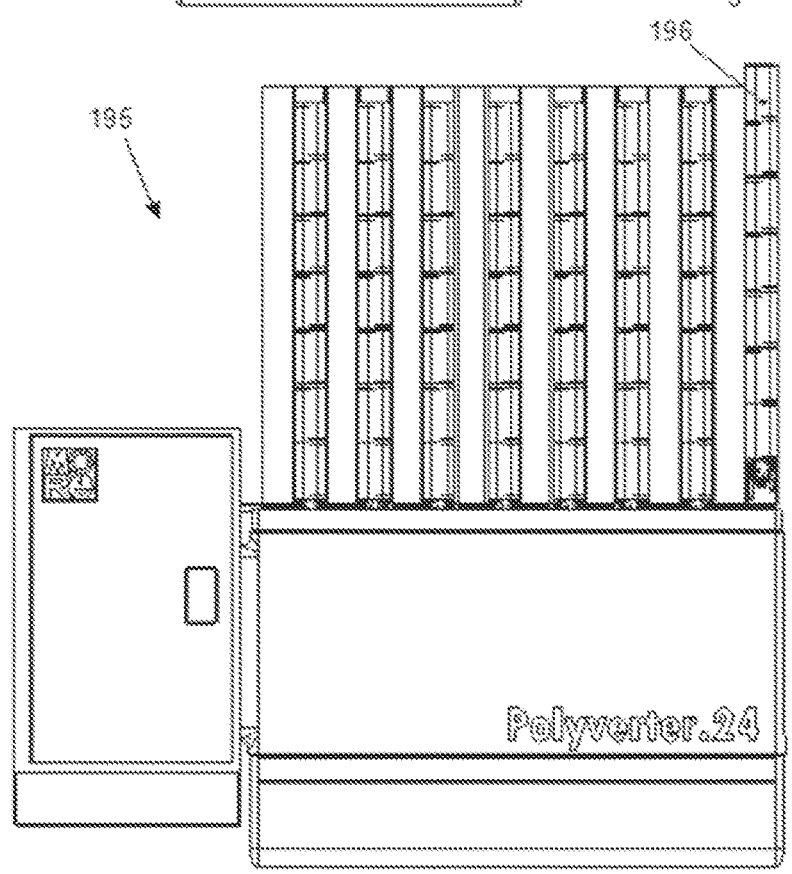
FIG. 1H shows an inverter undergoing maintenance having a detached battery module according to various embodiments.
Figure 1I:
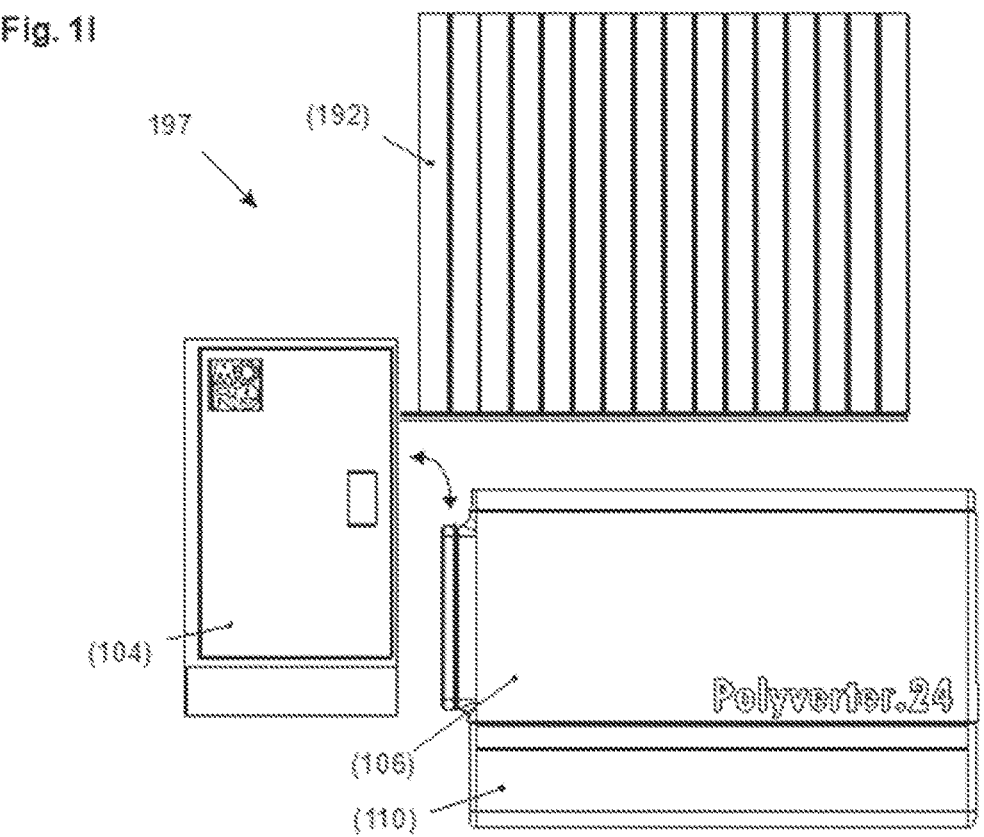
FIG. 1I shows an inverter with battery modules removed according to various embodiments.
Figure 1J:
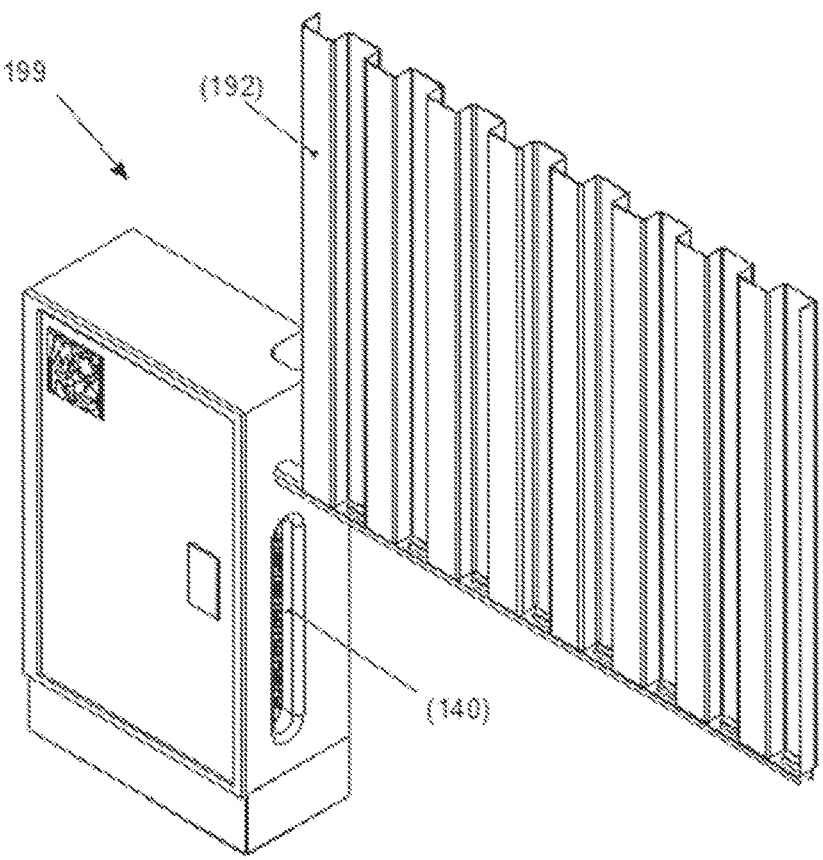
FIG. 1J shows an isometric view of an inverter undergoing maintenance according to various embodiments.

FIG. 1H shows an embodiment 195 of an inverter undergoing maintenance having a detached battery module 196. FIG. 1I shows an embodiment 197 from which all battery modules are removed from the isolator 192, allowing the power (106) and capacitor (110) modules to be detached from the stationary assembly 104. FIG. 1J shows an isometric view 199 of an inverter embodiment undergoing maintenance in which only the stationary, statically installed components remain. Element 140 is a feedthrough. The isolator 192 is shown with the battery modules removed in FIG. 1J. Additional static support and attachment components are not shown.

Balancer/Battery Management

Some embodiments of the present invention pass power through a bypass cable from a solar panel to a battery, some from a battery to a solar panel, some pass power in both directions at different times. Some embodiments employ a non-isolated boost circuit, a non-isolated buck circuit, or a non-isolated buck-boost circuit known in the art to charge a battery from a solar panel. Some embodiments employ a flyback or isolated converter to charge a battery. Some embodiments employ a non-isolated buck circuit, a non-isolated boost circuit, or a non-isolated buck boost circuit known in the art to supply current from a battery to a solar panel. Some embodiments employ a flyback or isolated converter to supply current from a battery to a solar panel. Some embodiments comprise a boost converter to charge a battery and a buck converter to discharge a battery, the buck converter and boost converter sharing a switch that may act as a synchronous rectifier.

Some embodiments may charge a battery from an isolated power source. In some embodiments, isolation is provided by one or more of the following: a capacitor, a coupled inductor, a photovoltaic cell. Some embodiments supply isolated power for charging from one or more of: bypass current from a bypass cable connected to a solar panel, power derived from an AC circuit, power derived from a DC bus, power derived from a DC string voltage. In some embodiments the power circuitry is sized to be able to substantially charge a battery in one charge period comprising one or more of: a solar day, the period before an inverter is started, a low-value-power interval, a period in which solar power would be net exported, a period in which solar power would be undervalued by a utility, a period in which power from a utility is relatively inexpensive, one day.

In some embodiments, battery power may be carried by current over a bypass cable to increase the overall power efficiency of a PV string. In some embodiments at some times, current flows in bypass cables bidirectionally substantially to minimize the total efficiency losses of the power electronics. For example, if a single panel is under producing, it may be more power efficient to boost its output by supplemental power on a bypass line, than to draw excess production from the rest of the solar panels. In some embodiments, a controller employs an efficiency model that may also take into account battery capacity and charge storage efficiency to calculate a substantially optimum current-balance setting. In some embodiments, current flows in bypass cables to maximize the solar array power output while re-supplying battery power.

Some embodiments of the present invention can provide backup power at night or in low solar illumination. In low light, some such embodiments set the battery charge controller circuit to pull power from its battery module. In some embodiments, this drawing of power produces a voltage that is communicated to the connected solar panel via current in a bypass cable. In zero light, the solar panel is substantially a series array of diodes that are forward biased by this voltage. According to the diode equation, the forward current flowing through the panel, which may dissipate electrical power, depends substantially exponentially on the ratio of the forward voltage to a threshold voltage. Some embodiments of the present invention maintain a low applied forward bias voltage by one or more of: controlling a buck converter that draws power from the battery module, drawing string current into the inverter, and diverting current from the solar panel to an optimizer circuit that delivers bypass power to the inverter. In some embodiments, the optimizer is architected so that its output power creates a pedestal voltage for the inverter. In some embodiments, the optimizer is architected so that its output power creates or supplements a high-voltage bus for the inverter. In some embodiments, the measured back-feeding of voltage to the panels produces a string voltage that reduces required voltage rating or voltage stresses on a switch that converts between normal string operation and voltage-boost mode operation.

Some embodiments comprise a diode or an electronic switch, a mechanical switch, a motorized switch, a relay, or solid-state relay, herein called a 'panel back-feed isolator.' Some embodiments comprising an electronic switch have a body diode disposed to prevent current from flowing from the battery discharge circuit to the otherwise connected solar panel. A panel back-feed isolator comprising a switch or relay may allow power to be back-fed to a panel and may reduce the forward voltage drop that would be otherwise incurred. A panel back-feed isolator according to the present invention may be physically located in one or more of the following places: at a solar panel, in a bypass cable junction tee or wye, in a node along a bypass cable, at a terminal of a bypass cable, in the stationary enclosure, in the wire terminal connector, in the power module, in the positive side of the bypass circuit, in the negative side of the bypass circuit. In some embodiments, the panel back-feed isolator is a ganged motorized switch, relay, or breakable connection. In some embodiments, this switch or relay may share circuitry and mechanisms of a 'DC disconnect.'

Figure 2A:
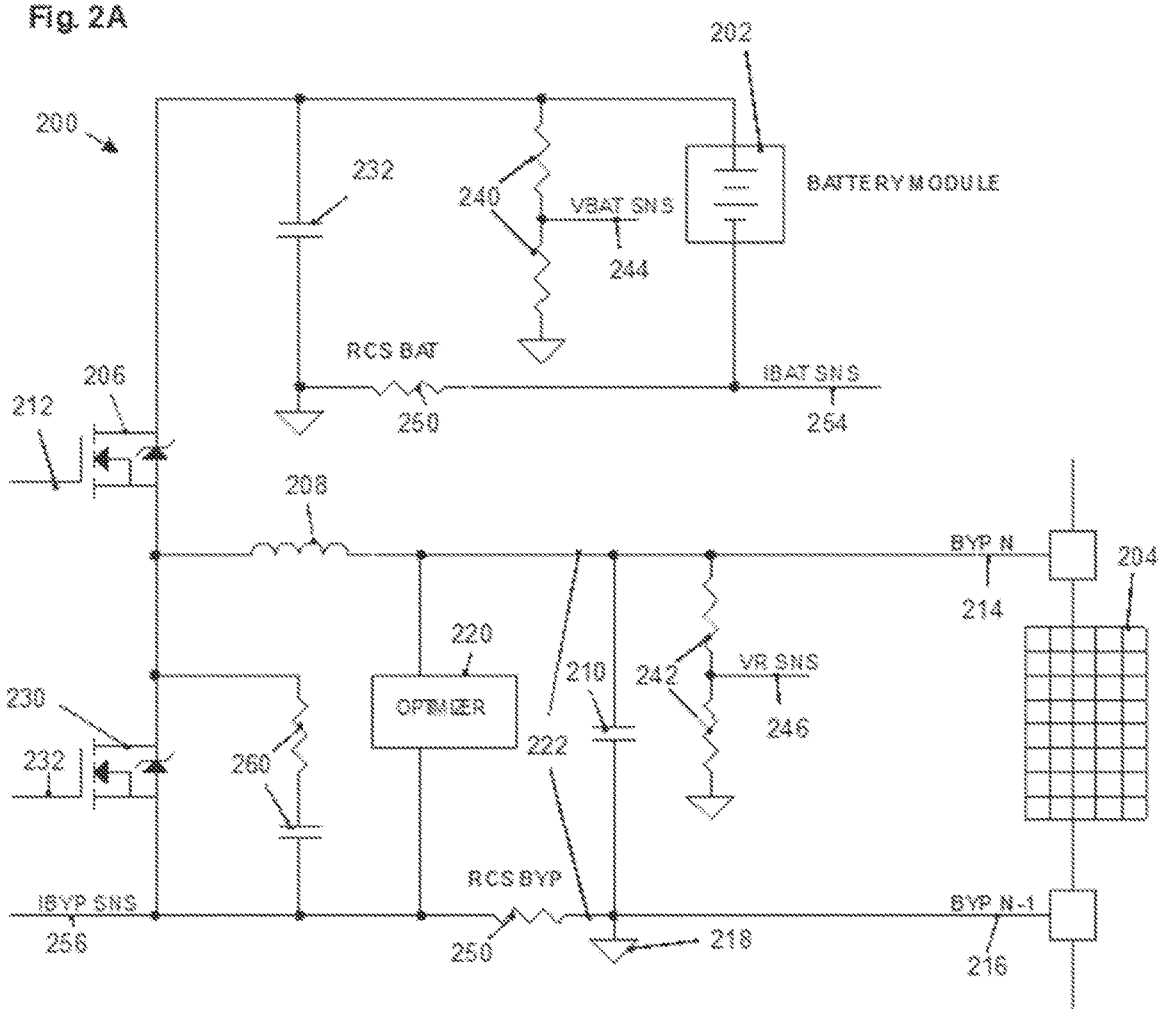
FIG. 2A shows a simplified schematic diagram of a battery charge control circuit according to various embodiments.

FIG. 2A shows a simplified schematic diagram of an embodiment of battery charge control circuit (200) in accordance with the present invention. Element 202 is a battery module, comprising at least one galvanic cell. The battery module may comprise additional elements as described later. In this embodiment, the battery module is designed to have a higher voltage than that of the connected solar panel, 204. Switch 206, inductor 208, and capacitor 210 comprise a buck converter wherein applying a periodic gate signal 212 controls the rate of discharge of battery 202. Current from the battery module may be applied, to solar panel 204 through bypass cables 214 and 216 respectively connected to the positive and negative terminals of the solar panel, to a controllable load 220 herein generically called an 'Optimizer.' In some embodiments an optimizer is a prior-art power circuit that draws power from a bus circuit 222 and supplies the power to a load that is, in some embodiments, an inverter. In some embodiments, the 'Optimizer' bi-directionally draws and supplies power to bus 222. Some or all current from the battery module or buck circuit (206, 208, 210) may be supplied to the solar panel 204. Some embodiments further comprise switch 230 controlled by a second gate signal 232. The symbol 218 denotes a common voltage that may be used as a reference. In some embodiments, elements 230, 208, 206, and 232 comprise a boost circuit, that boosts bus voltage 222, allowing power to flow from the bus to charge battery module 202. Elements 240 and 242 are respectively resistive voltage dividers that may be included to produce signals 244, a battery voltage indication, and 246, a bus/solar-panel voltage indication. Elements 250 and 252 are respectively current-sense resistors that may be included to produce signals 254 and 256, respectively a battery-charge- and bus-current indication that may be used in a control algorithm. Some alternative embodiments utilize alternative methods or locations to obtain voltage or current indications as known in the art. Element 260 is an embodiment of 'snubber' circuit as known in the art. Some embodiments employ no or alternative snubber circuits and locations as known in the art.

Figure 2B:
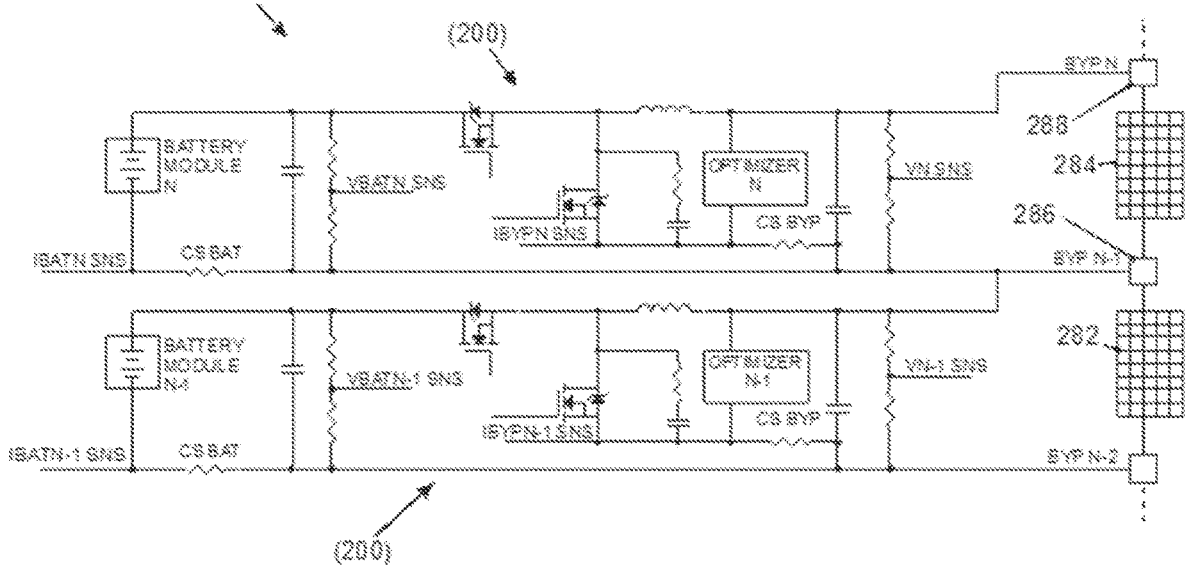
FIG. 2B shows a plurality of battery charge control circuits according to various embodiments.
Figure 3A:
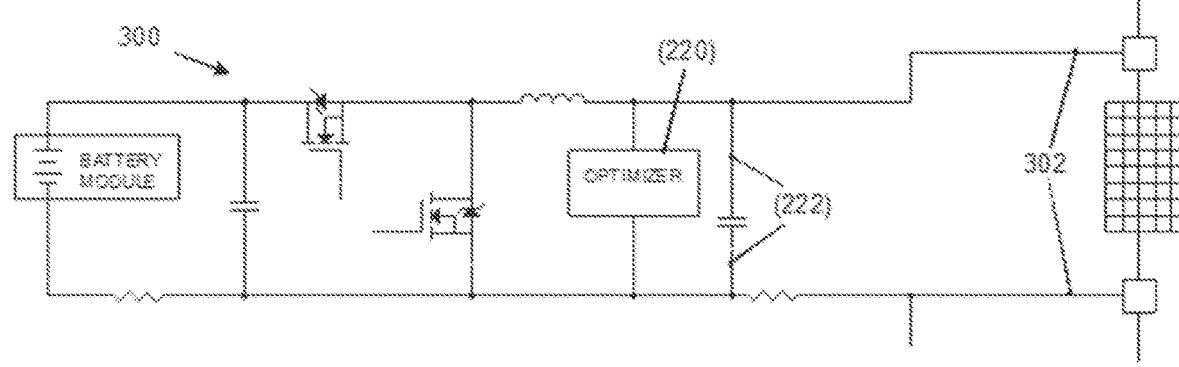
FIG. 3A shows a schematic diagram of a variant of a circuit according to various embodiments.
Figure 3B:
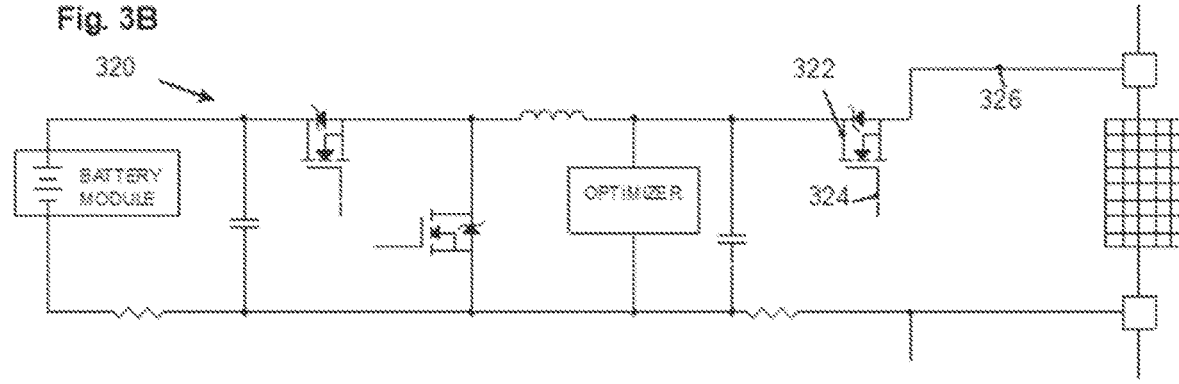
FIG. 3B shows a schematic diagram of a variant of a circuit according to various embodiments.
Figure 3C:
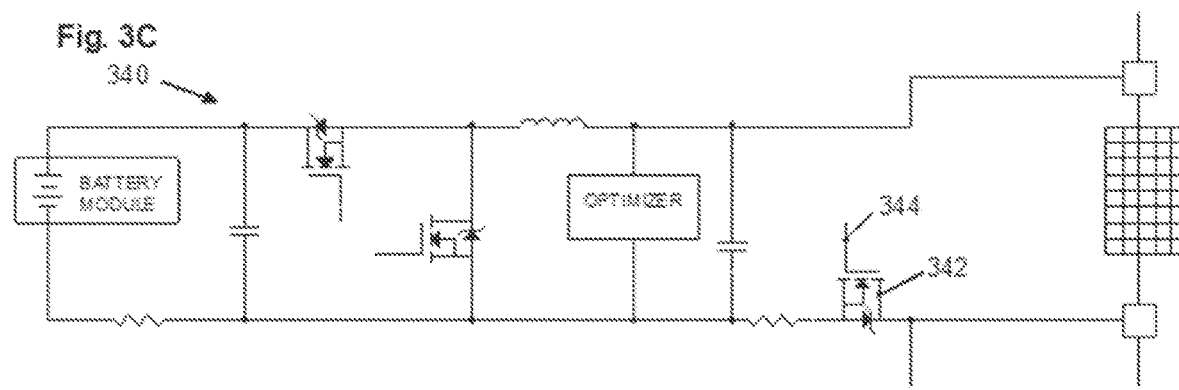
FIG. 3C shows a schematic diagram of a variant of a circuit according to various embodiments.
Figure 3D:
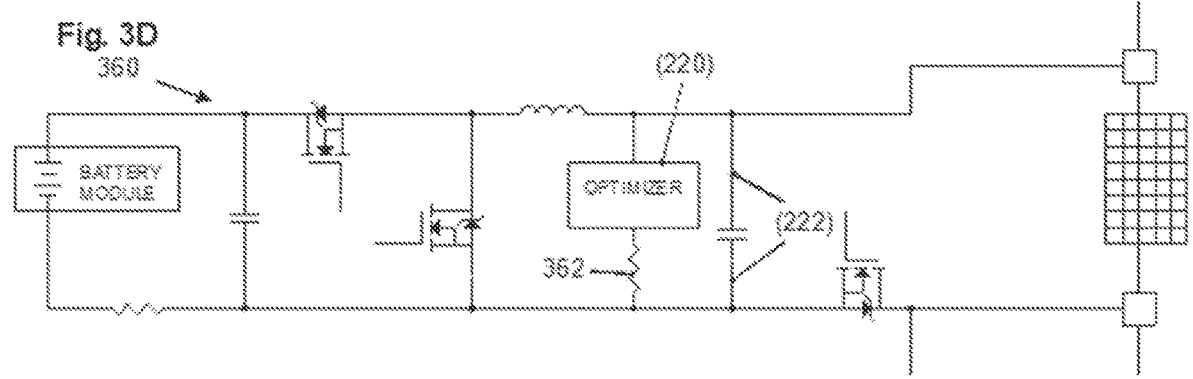
FIG. 3D shows a schematic diagram of a variant of a circuit according to various embodiments.

FIG. 2B shows an embodiment of a plurality 280 of battery charge control circuits that may be stacked while connected to a series-connected array of solar panels. Elements 282 and 284 are respectively N−1th and Nth solar panel in a series connected string. Element 286 is a connector between panels 282 and 284 that further comprises a bypass cable or connector to a bypass cable to an N−1th circuit 200. Element 288 is a similar connector to an Nth circuit 200. Each circuit 200 in the string may have a different common reference voltage.

FIGS. 3A-F show schematic diagrams of variants of circuit 200. In variant 300, there is no isolation of the bus voltage on the bus circuit (222) from the solar panel voltage 302. In some such embodiments, the battery module does not supply power when the photocurrent of the panel is sufficiently low. In some other embodiments, the battery module supplies a voltage that is sufficiently low compared to the series-connected solar cell diode threshold voltage that an acceptably low current leaks through the solar panel, while providing power for the optimizer circuit (220) to process. In some embodiments, the Optimizer can supply power to bus 222.

In embodiment 320, a switch 322 controlled by gate signal 324 may be employed to block current from flowing from the bus to the solar panel. This gate signal may be applied via a level-shifted or isolated signal from a microcontroller or logic circuit using the common reference for circuit 320 or via a second microcontroller or logic circuit that uses substantially the voltage at 326 as a common reference. In some embodiments that second microcontroller or logic circuit is an element of a second circuit 320 in a series string.

In embodiment 340, switch 342 and gate signal 344 can block current from flowing from the bus to the solar panel. Signal 344 can be supplied without voltage isolation by logic or gate-driving circuitry referenced to the common voltage reference of circuit 340.

In embodiment 360, the current sense resistor 362 is located in a different position with respect to the bus 222 and Optimizer circuit 220. Changing the location of a current sense resistor is known in the art and the locations of these resistors are not intended to be limiting.

Embodiment 380 uses a switch 382 or plurality of switches, e.g., 382 and 384 to prevent current from flowing from bus 222 to 302. Some embodiments further comprise a gang between a plurality of switches 386. In some embodiments, this switch is located proximal to or comprises a wire-terminal connector. In some embodiments, one or more of these switches comprise a 'DC cut-off switch.' In some embodiments at least one switch is actuated. Such a switch may avoid duplication of series switches in the conductive path between a panel and circuit 200.

Some embodiments comprise a DC cut-off switch that may further provide a series connection of battery modules directly to the input of an inverter. Some such embodiments may have the advantage of reduced converter losses. Some embodiments alternatively connect circuits 200 in series.

Embodiment 390 contains an auxiliary circuit that may feed power to the bus 222 from a source other than the battery module, solar panel, or Optimizer circuitry.

Figure 4:
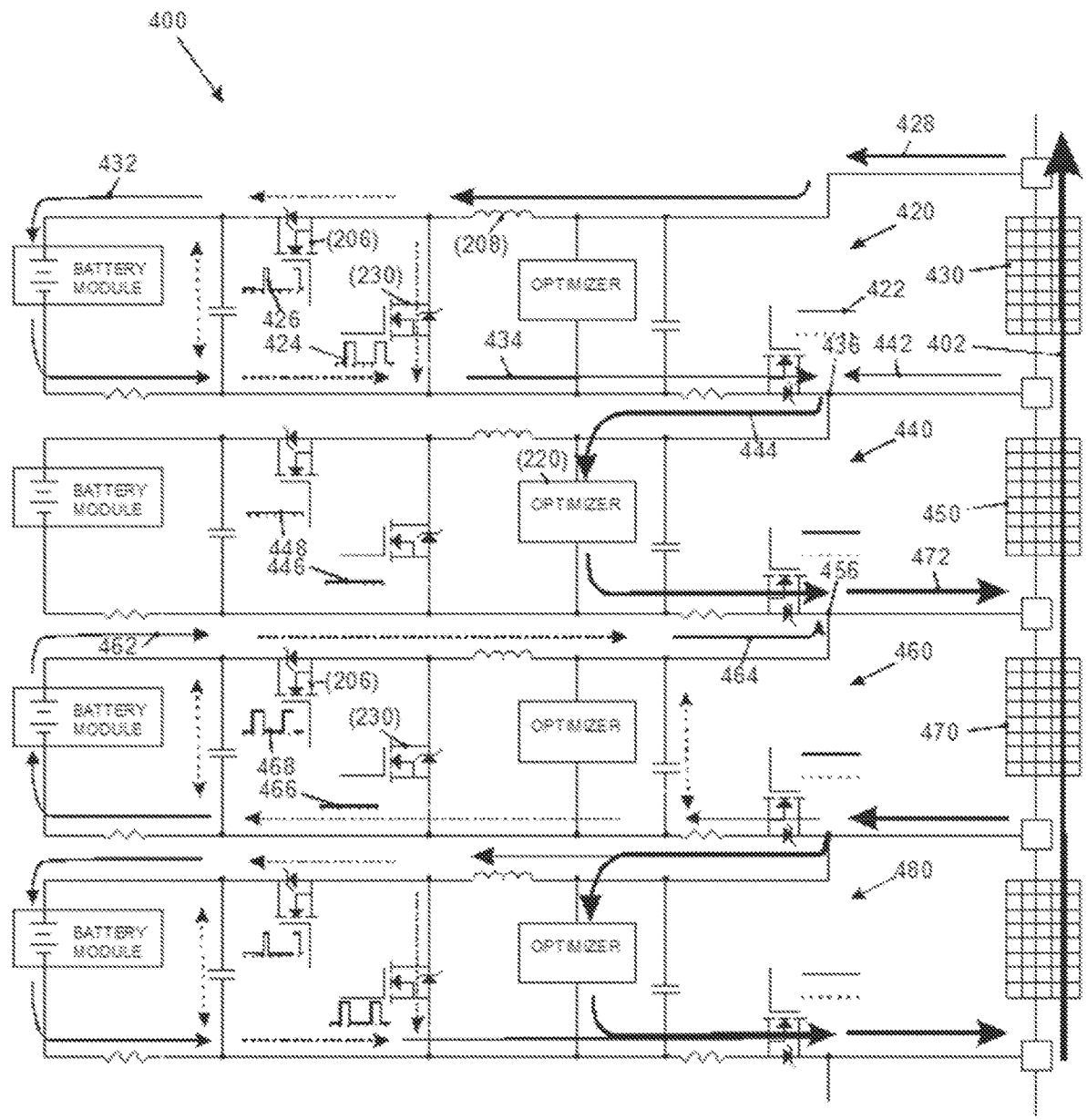
FIG. 4 shows an array of four circuits according to various embodiments.

FIG. 4 shows a hypothetical array 400 of four circuits, each operating in different modes that would be typical of a system during daylight hours. A string current flows through conductors along path 402. In some embodiments, some of these conductors comprise cables integrated into the solar panels. Circuit 420 is operating to charge the battery by closing an isolation switch, if present, by applying a fixed high potential 422 to a gate and by further applying a sequence of pulses 424 to a switch 230 to effect a voltage boost to apply a charging voltage or current to the battery. Some alternative embodiments comprise a buck converter, wherein the panel is at a higher voltage than the charging voltage of the battery. In some embodiments a pulse sequence 426 is applied to a second switch 206 to reduce losses in the manner of a synchronous rectifier, known in the art. In some embodiments, the current through inductor 208 is continuous and the gate voltage 426 is a constant high voltage, leaving the switch 206 closed. The arrows depict current. Solid arrows depict the direction of substantially DC currents. Dashed lines depict pulsating currents. Thicker lines depict greater current. Current 428 drawn from the solar panel 430 is converted to battery charging current 432. Current 434 comprises the return current of from the charging circuit. In some embodiments, this current sums with the current 442 in the bypass cable and the current drawn by circuit 440 at node 436.

In 440 the Optimizer (220) is drawing power from the panel and the battery charging and discharging circuit is turned off by applying off-state gate signals 448 and 446.

In 460, the battery module is supplying current 462 through a buck converter circuit to add current 464 to the node 456. The buck converter is controlled by applying an off-state gate voltage 466 to the boost switch 230 and a pulse train 468 to the buck switch 206. As a result, a current 472 flows into the node between panels 450 and 470.

In 480, current is being drawn both into the optimizer and battery charger circuit.

The magnitude, and in some embodiments direction of the bypass current extracted from the solar panels may be adjusted in concert with or in reaction to the string current along path 402 such that each solar panel is substantially operating at its maximum power production point. The decision to charge a battery, discharge a battery, draw power into an optimizer, source power from an optimizer, isolate a solar panel, and to exchange power from an auxiliary circuit to or from a battery may be made in concert to achieve one or more of: a target state of charge for at least one battery module, operation of a solar panel at its maximum operating point, operation within a temperature envelope, operation within a voltage envelope, operating within a current envelope, operating within a power limit, operating within a surge power limit.

Figure 5:
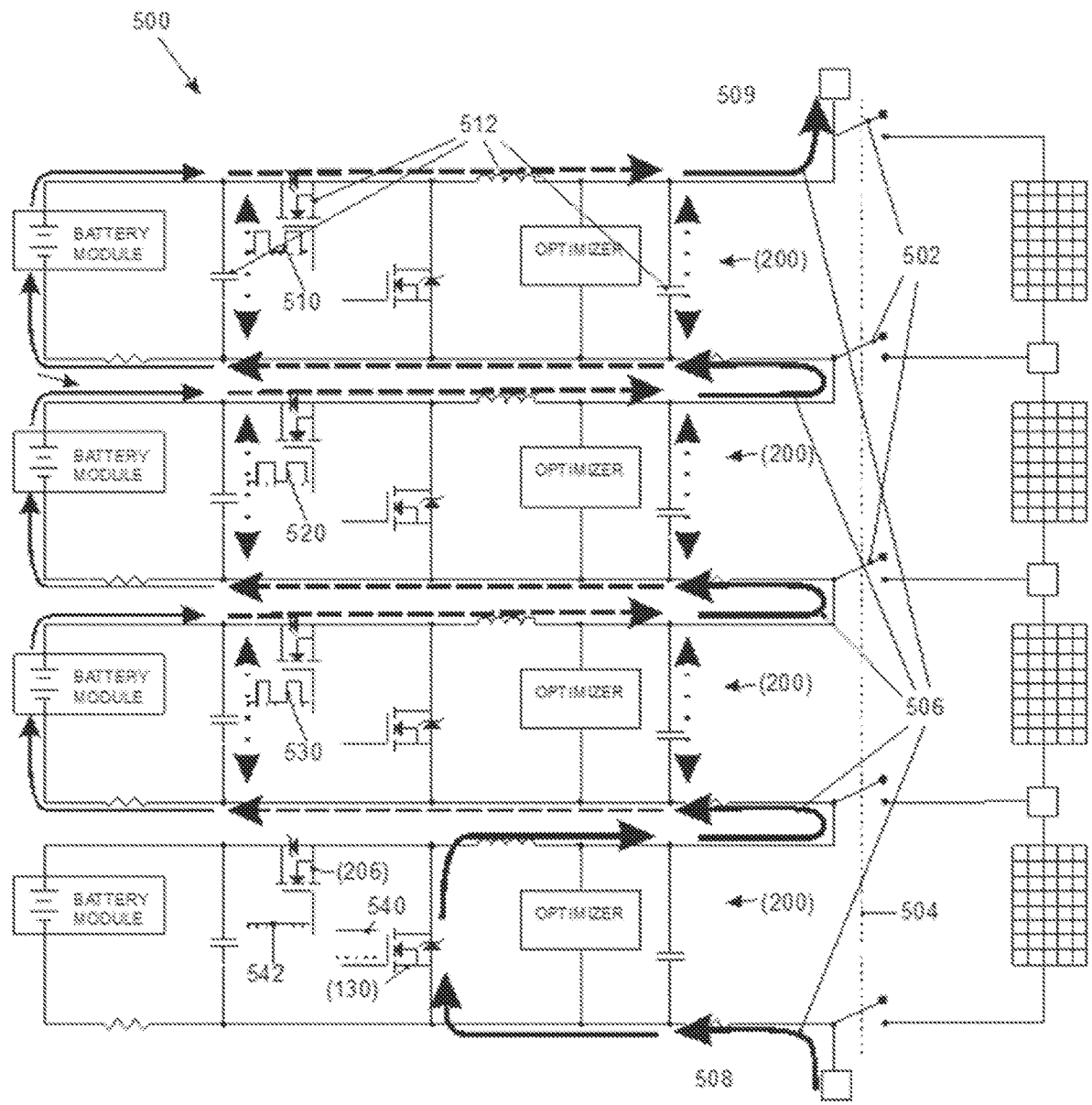
FIG. 5 shows a plurality of switches or a ganged switch according to various embodiments.

FIG. 5 shows an embodiment 500 comprising a plurality of switches 502 or a ganged switch (gang 504), comprising an array of embodiments of circuits 200 each having a separately determined gate waveform (510, 520, and 530) controlling a buck converter (e.g., 512) to produce a common current 506 to terminals 508 and 509, which in some embodiments are DC power input connections to an inverter.

In some embodiments a switch 230 is driven with an on-state gate signal 540 while switch 206 is driven with an off-state gate signal 542 such that current is shunted from the battery pack through 230.

In some embodiment the control waveforms (e.g., 510, 520, 530, and 540, 542) are jointly adjusted to do one or more of the following: drive a battery toward a desired state of charge, balance the state of charge of a battery, connect a battery constantly, disconnect a battery constantly, discharge a battery, produce a desired current, produce a desired voltage, produce a desired power, produce a desired voltage across terminals 508 and 509, limit the voltage across terminals 508 and 509, limit a battery temperature, limit a converter temperature, limit a peak current, limit an RMS current.

Figure 6:
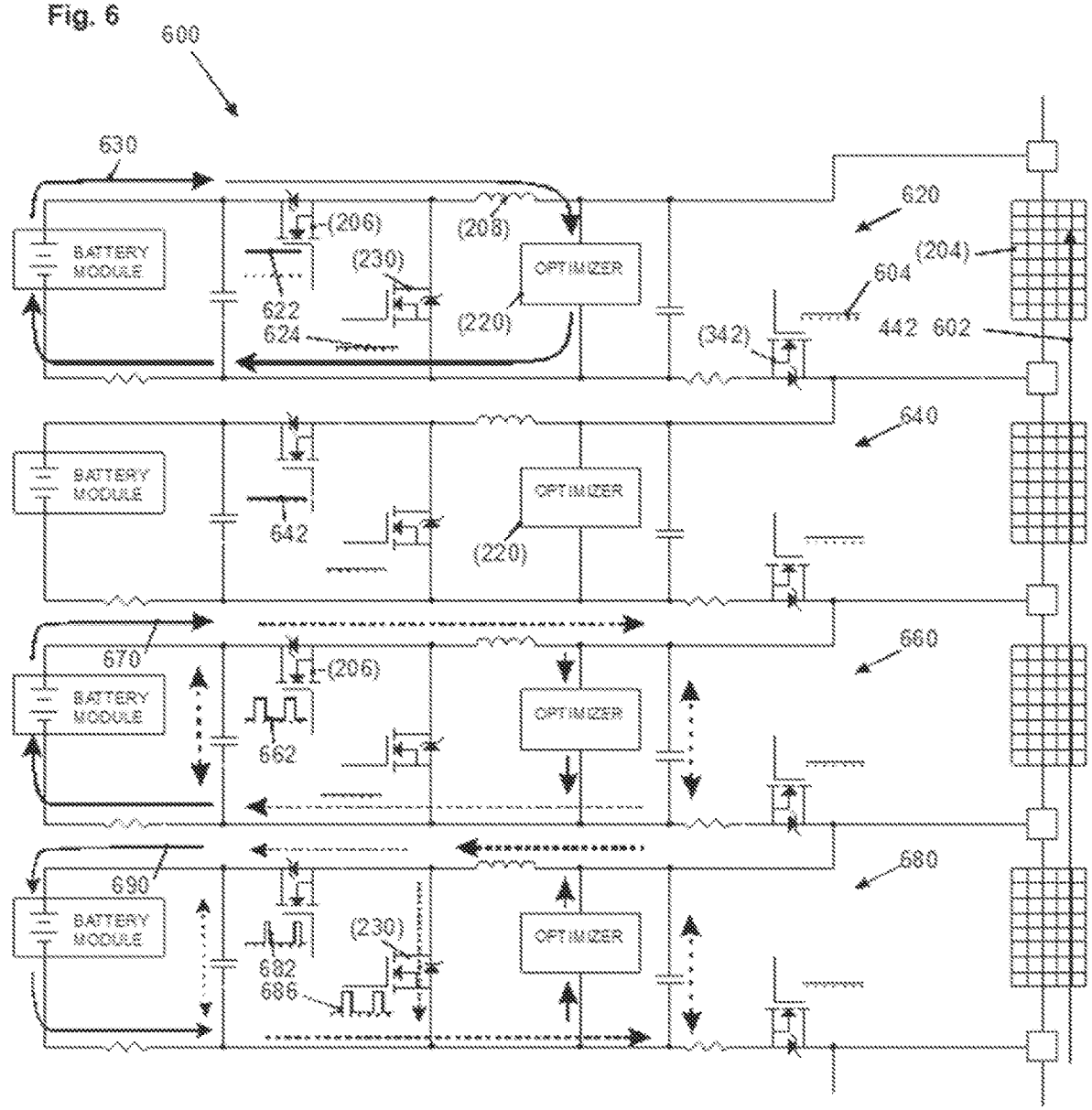
FIG. 6 shows an array of circuits according to various embodiments.

FIG. 6 shows an embodiment 600 of an array of circuits 620, 640, 660, and 680 (each of the circuits 620, 640, 660, and 680 having one or more of the features of the circuit 200), each operating in modes that may be used in low or no light. A common string current 602 may flow through the array of panels. At some times this current may be zero. At some times this current may be negative. Current from a connected solar panel may be blocked by a switch, e.g., 342 with off-state gate signal 604. Circuit 620 is operating with switch 206 turned on by gate signal 622 and 230 turned off by gate signal 624, allowing current and power to flow from the battery module to the optimizer circuit (220).

Circuit 640 is operating with the battery disconnected (via gate signal 642) so that the battery is not providing power for the optimizer.

Circuit 660 is drawing current 670 from the battery module and operating with voltage from the battery module reduced via applying a waveform 662 to switch 206. In some embodiments, a conversion from a battery voltage to another voltage applied to an optimizer may be used for one or more of: keeping within operating limits, maximizing system efficiency, signaling a status to an optimizer stage, maintaining a constant voltage at the optimizer, providing headroom for fast reaction to transients.

Circuit 680 is supplying current 690 to the battery module by drawing power from the optimizer. In the illustrated embodiment, the voltage from the optimizer is being boosted to the battery module, e.g., by applying switching waveform 686 to 230 and in some embodiments by applying a switching signal 682 that makes switch 106 function as a synchronous rectifier. In some alternative embodiments, signal 682 corresponds to a constant on-state signal and signal 686 corresponds to a constant off-state signal and the voltage output of the optimizer is substantially applied to charge the battery module. In some alternate embodiments, a buck circuit powered by the optimizer charges the battery module.

Some embodiments of circuit array 600 operate at different times in different modes. In some embodiments, the mode of each circuit 620, 640, 660, 680 is selected and the operating point of that mode may be set to perform one or more of the following: drive a battery toward a desired state of charge, operate an optimizer at an efficient power point, operate an optimizer within a desired input voltage/output voltage/current envelope, maintain a desired bus voltage at the output of an optimizer, maintain a voltage or voltage range at the input of a connected inverter, keep a temperature within a range, keep a current within a range, keep a power within a range. Some embodiments select the operating mode and operating point based on a measured or inferred charge state of a battery.

The circuit array 600 in some embodiments is feeding an inverter via a plurality of optimizers. In some embodiments, the inverter is connected to a power grid. In some embodiments the inverter is not connected to a power grid. In some embodiments, the inverter can operate connected and not connected to the power grid. In some embodiments, circuit array 600 provides for supplying power to a load, the grid, or a combination of loads and grid in low light or at night.

Some embodiments of optimizers only can draw current from a panel. In some embodiments, a power from the battery module may be discharged to supplement the panel current in the string, providing limited bi-directional current flow to the panel. This may produce an imbalance in the state of charge of battery modules. In some embodiments, this state of charge may be re-balanced at a desirable time, e.g., a time of peak energy price or demand by selectively drawing down relatively charged battery modules to rebalance the charge state.

Battery Module

Some embodiments of the present invention further comprise at least one series arrangement of galvanic cells, herein called a 'battery' breakably connected to one terminal of a solar panel. As used herein, the term 'cell' may refer to a single galvanic cell, or an arbitrary arrangement of parallel and serial galvanic cells. As used herein, 'connection' means in electrical communication with, i.e., having a conductive path between both connected items. A plurality of intermediate conductors may be present between two connected items. These intermediate conductors may be semiconductors or have switchable conductance. As used herein, 'direct connection' means connection substantially without intermediate items such as long cables, switches, and additional circuitry, but includes printed circuit board traces and the like where the function of the intermediate circuitry is primarily to allow the flow of charge between the directly connected objects. As used herein 'breakable connection' means having electrical circuits that can be closed, allowing current to flow, or open, preventing current from flowing, through a mechanical motion of conductors toward, across, or away from each-others' surfaces, typically using a connector as known in the art of electronics, implying a temporary electrical connection as opposed to a substantially permanent connection such as a solder joint, crimp, single-use press-fit, etc. As used herein, the 'connector gender' differentiates one or more mating conductor pairs and their support housing involved in a breakable connection. As known in the art many but not all such connections are asymmetrical. As used herein, 'opposite gendered connector' or 'mating connector' describes the corresponding mating connector of one or more conductor pairs. As used herein, connector pair may comprise an arbitrary arrangement of symmetrical or asymmetrical conductor pairs of either orientation.

In some embodiments the battery is packaged with one or more of a battery management system, charge balancer, breakable connectors, non-volatile memory, flash, EEPROM, printed circuit board, wires, voltage detection and supervisory circuits, current detection circuits, thermal sensor, thermal sensor diode or transistor, thermistor, fuse, resettable fuse, resistor, switch, electronic switch MOSFET, IGBT, solid-state switch into a module, herein called a 'battery module.' Some battery module embodiments further comprise one or more of: a seal, a latch, a mechanical reinforcement, an insulator, a heat spreader, heat transfer grease, an indicator.

As used herein, the 'battery module connector' comprises the gendered assembly of individual breakable connections of the battery module. The 'battery module mating connector' comprises the oppositely gendered connector to that of the battery module connector.

Battery Adapter

Some embodiments comprise a fixture, herein called a 'battery adapter' which may allow a plurality of battery modules to be combined with at least one substantially common voltage. Some arrangements are substantially parallel. Some arrangements are switched so that one module is utilized at a time. Some alternative arrangements have separate charge-control circuitry. The advantage of this arrangement may include extended capacity, lower charging or discharging battery stress, and higher discharge current. In some embodiments, the battery gang comprises circuitry to facilitate a microcontroller to communicate independently with each connected battery module. This communication may be digital, analog or both. In some embodiments, the battery gang adaptor comprises one or more battery module mating connectors. In some embodiments, the battery gang further comprises least one battery module connector. In some embodiments the battery adaptor may comprise a battery module connector having a different physical or electrical arrangement. In some embodiments, a battery module adapter may further comprise circuitry to enhance the operation of the hybrid inverter of the present invention. Some such enhancements may comprise inter-module state-of-charge balancing, charge control, adaptation to new design revisions or vendor requirements, etc. Some embodiments further comprise one or more of: a seal, a latch, a mechanical reinforcement, an insulator, an indicator.

The assembly of one or more battery modules into a battery adapter is herein called a battery module gang. It is intended that the battery module gang be an enhancement to a battery module and for each reference herein to a connection or operation on a battery module further implies an alternative connection to a battery module gang. In some embodiments, one or more battery module gangs may be connected to a second battery module adapter. Such recursive arrangements of battery modules and battery module gangs are also herein an implicit alternative to a battery module.

Some embodiments comprise more than one battery module or battery module gang, each breakably connected to a conductor in electrical communication with one terminal of a different solar panel in a series string.

In some embodiments, one terminal of at least one and preferably each solar panel in a string has a battery connected via a conductor directly or through a charge-block switch to one terminal of a battery. In some embodiments, the charge-block switch may block excessive charge current from flowing in a battery fault or over-discharge event. In some embodiments, the charge-block switch is integrated into a battery module.

In some embodiments, the charge-block switch default state is off. In some embodiments, this switch state prevents battery voltages from being present at terminals when the battery module is disconnected. In some embodiments, this default state is set via a pull-down resistor on a switch gate.

In some other embodiments, the charge-block switch default state is on. In some embodiments, this default state is set via a pull-up resistor on a switch gate to a battery voltage on in the battery module.

Some embodiments comprise a discharge-blocking switch.

Some battery module embodiments comprise a plurality of series-connected cells, each further comprising a parallel load and switch such that current in the string of cells may be shunted away from an individual cell. In some embodiments, a supervisory circuit measuring the voltage across a cell may actuate the parallel load switch when it detects a voltage related to a substantially charged condition. In some embodiments, a microcontroller may sense the cell voltage via one or more of an A/D converter, resistive voltage divider, analog switch, voltage reference. In some embodiments, the voltage threshold is adjusted for measured battery module temperature. In some embodiments, a microcontroller may actuate a parallel load switch that shunts current from the cell through a load. In some embodiments, the shunt switch is operated in a binary on-off sense. In some embodiments, the switch is actuated as a variable conductance. In some embodiments, a supervisory microcontroller may communicate an end-of-charge signal to a charge controller or change an internal charge-control programming state in response to a measured voltage or current.

In some embodiments of the present invention a microcontroller or supervisory circuit changes its charging state upon detection of an 'end-of-fast-charge' trigger that occurs when a cell within a battery module reaches its end-of-charge voltage. In some embodiments the change is from a 'fast-charge' state, e.g., charging at 0.1-3 C as known in the art, with or without module voltage and temperature feedback control, to a 'slow-charge' state, e.g., charging at a lower current or according to a different algorithm. In some embodiments the slow-charging current is less than or equal to the bypass current of the parallel shunt so that a cell within a battery module cannot be overcharged. In some embodiments, the end-of-fast-charge trigger is an abrupt change in voltage or current associated with the actuation of a parallel load. In some embodiments, this change is detected via analog to digital (AD) sampling on a microcontroller or a circuit that is sensitive to a relatively rapid change in the voltage, current, or impedance of the battery module as known in the art, e.g., an AC-coupled circuit to a comparator, etc.

Isolated Sensing of Cell State

Used herein a 'deprecated state' is a state of charging or discharging that could lead to damage of a cell, such as an over-temperature, over-voltage or over-current on charge, or an under-voltage or over-current on discharge. In some embodiments a deprecated-state indication is provided by a supervisory circuit, typically via a one or more digital signal lines, each, possibly containing a pull-up or pull-down resistor to establish a quiescent state. If each supervisor circuit is referenced to a cell potential, an isolated means of sensing a deprecated state on a common-module signal line may be needed. In some embodiments, each supervisor's indication is connected capacitively to the same signal that is detectably disturbed from quiescence by a change to a deprecated state of any cell. In some embodiments, the supervisor indication is connected to an electronic switch that changes the impedance of the common signal line, e.g., by electrically connecting a series capacitor on the line to an AC ground, e.g., the positive or negative battery voltage. In such an arrangement, a change to a deprecated state may be detected by an microcontroller or other circuit by momentarily driving the common line from quiescence and measuring how long it takes for the voltage or digital state on the line to return to quiescence after removing the driving, e.g., by tri-stating a bi-directional pin. This delay may be measured periodically or on command while the battery module is being charged. An advantage of the time-delay measurement may be a reduced sensitivity to noise spikes or a relaxation in the prioritization of sampling a pin, since the measurement can be repeated, where a single transition event may be missed or incorrectly detected, e.g., because of noise or latency.

In an embodiment, the nominal return-to-quiescence delay may be detected when it is separately known or inferred that all cells are not in a deprecated state. This may allow differences in parasitic capacitance of different modules and module gang arrangements to be compensated.

In some embodiments, calibration and information parameters associated with a battery module may be stored in non-volatile memory in a battery module, including one or more of: battery type, threshold over- and under-voltages and over-currents, capacity, serial number, temperature coefficients, charge algorithm parameters, date of manufacturing, manufacturer, lot number, location of manufacturing, etc. In some embodiments, this memory may be accessed by a serial communication means as known in the art, preferably one that provides for communicating with daisy-chained or bussed devices, e.g., SPI, I2C, UNIO, and other schemes known in the art. Some embodiments further allow data to be written to non-volatile memory in a battery module. Such data may include one or more of: cycle count, charge-discharge history, data logs, measured charge/discharge capacity, measurements, voltage, current, temperature, resistance, faults, and run-time parameters of use in optimizing charging/discharging algorithms. In some embodiments, usage data stored on a battery cell may be used as part of a recycling/reuse program to bin modules, diagnose premature failures or degradation, identify supply-chain problems and to refine charge-control algorithms.

In some embodiments, a visual machine-scannable code, e.g., a bar code, QR code, etc. bears static module information in a non-contact scannable exterior location.

In some embodiments of the present invention a microcontroller or supervisory circuit changes its discharging state upon detection of an 'end-of-discharge' trigger associated with a cell within a battery module reaching its end-of-discharge voltage. Some embodiments of the present invention comprise a supervisory circuit measuring the voltage across each cell in a string that sets or clears a digital output when the cell voltage drops below a threshold.

Swapping Battery Modules

In some embodiments of the present invention, a technician or end user may periodically, on detection of a fault, or on detection of a non-ideal battery arrangement, disconnect a battery module and plug in a battery module. In some embodiments, a battery module position may be swapped so that a battery is connected to a different panel in a string. In some embodiments, a new battery module may be inserted. Some embodiments support a plurality of battery types, voltages, capacities, maximum currents and ages/cycle counts by separately tailoring charge and discharge parameters per battery module.

The swapping of battery modules may be software optimized and guided step by step using an app or software.

In some embodiments, a battery module having reduced or enhanced charge capacity may be inserted, for example to tailor the battery capacity to excess or deficit power production of a panel in a string.

FIG. 7A shows a front view 700 of a battery module according to an embodiment of the present invention. Elements 702 are an array of series-connected rechargeable batteries. Element 704 is a battery charge management circuit board with individual connections 706 to the junctions between batteries (708). Elements 710 and 712 are bi-directional power connections. Element 712 is a set of auxiliary connections to the battery charger controller of the power module (106) that communicate one or more of: end of charge, end of discharge, cell type, temperature, charge profile, charge history, state of charge, serial number, date of manufacturing, charge/discharge limits, cell chemistry.

FIG. 7B shows a side view 760 of a battery module embodiment. Keeping cells in a single layer may assist in maintaining uniformity in cell temperature, minimize cell overtemperature, and foster improved fire safety of more densely-arrayed cells.

FIG. 7C shows a back view 780 of a battery module embodiment.

Figure 8:
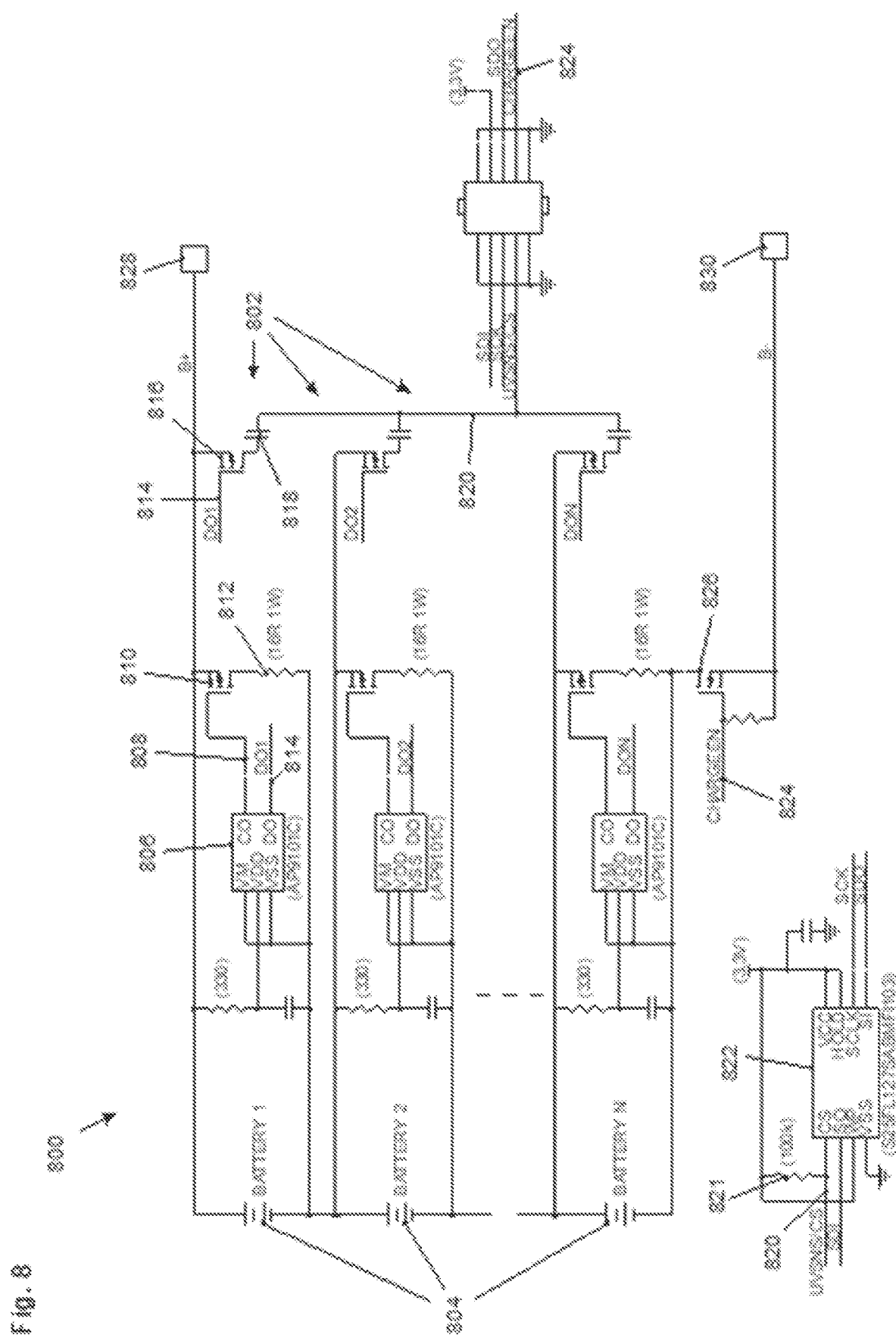
FIG. 8 shows a schematic diagram of a battery charge management circuit according to various embodiments.

FIG. 8 shows a schematic diagram of a battery charge management circuit 800 according to an embodiment of the present invention, comprising an array of sub-circuits 802, each having a connection across a battery in the series array 804. Parts and component values in parentheses are illustrative and are not intended to be limiting. In this embodiment, a standard battery management integrated circuit 806 senses the battery voltage with high precision. When 806 detects the cell voltage has reached a substantially charged-state level, the circuit drives pin CO (808) low, turning on switch 810 and shunting charge and battery current through ballast resistor 812. When 806 detects the cell voltage has reached a substantially discharged-state level, it drives pin DO (814) low, turning on switch 816, which applies an AC-ground via capacitor 818 to the common undervoltage sense circuit 820. In this embodiment, this signal is multiplexed with a chip-select signal for a memory device 822. A pull-up resistor 821 may combine with one or more instances of capacitor 818 when one or more cells are discharged to increase the rise time of signal 820 from a low state. Such a change in time delay may be used by a microcontroller or other circuit to detect end of discharge.

A charge-enable signal 824 may be applied to switch 826 to allow the battery module to charge, e.g., to stop blocking reverse current. Some embodiments further comprise an over-discharge-current limiter, provided for example by a supervisory circuit such as a an AP9101C integrated circuit in concert with a switch such as a MOSFET as known in the art. Only one such circuit is required per module since all currents are in series. Some such circuits further comprise a transient voltage protection device to prevent damage to the switch from inductive voltage spikes. Some embodiments use one of the existing circuits 806 to perform this function. Some embodiments use an extra supervisory circuit having at least one different voltage threshold setting from that of 806. Some circuit embodiments further comprise a positive temperature coefficient resettable fuse. Some circuit embodiments further comprise a conventional fuse. Some circuit embodiments further comprise a circuit breaker.

Elements 828 and 830 are respectively the positive and negative output terminals of the battery module.

External Switch Actuator

Motorized and actuated circuit breakers and switches are known in the art. Such prior-art breakers may cost a premium over standard commodity switches and breakers. An element of the present invention is an external switch actuator that mimics the action of fingers on either side of the switch lever of a commodity breaker or switch, herein called actuator 'fingers.' Fingers according to the present invention may comprise an object having an edge substantially perpendicular to the motion of a switch lever on either side of a switch lever. Some finger embodiments comprise a slot or hole in a sheet-metal or plastic bar. Various embodiments of an external switch actuator allow manual override in one (on or off), two, or no positions, or only on emergency override. In some embodiments, the mechanism of denying override is to maintain the actuator fingers in a position that prevents the switch state from being manually changed, but allows the normal function of the switch, e.g., allows a circuit breaker switch lever to flip to its tripped position, but not be reset manually. In such a case an actuator finger may be actuated to a position that flips the switch, then backed to an intermediate position. In some alternate embodiments, the breaker switch is held firmly in the 'on' position and the internal relay mechanism that prevents re-closing is relied upon for proper breaker action, with the disadvantage that the breaker-lever position stops properly indicating the tripped state. For standard switches or for breakers set to the off position without manual override, the fingers may be actuated without the backing operation. For switches without manual lockout, the fingers may be spaced and backed into a position following switching that allows the switch lever to be flipped in either direction without interference. Some embodiments of the present invention allow an emergency override by lifting the fingers away from the switch lever. Some embodiments of the present invention comprise a fixed or removable mechanical component linked or unlinked to the fingers to prohibit manual actuation. Some embodiments of the present invention allow prohibition functions of an actuator to be set in the field by installing an inhibitor apparatus of the desired functionality.

Some embodiments further comprise a housing that provides reaction forces to allow fingers to actuate switches. Such forces may be relatively high for certain switches, such as service disconnects. Some such housings compromise one or a plurality of fixed magnets, such as rare-earth, AlNiCo, etc., that hold the switch housing to the steel surface of a switch panel. Some embodiments employ a plurality of magnets. Some such magnets have a component of offset in the direction of switch actuation between 10 mm and 200 mm and preferably in the range 50-120 mm. Some such magnets have a total attractive force to a painted steel panel of 5-100 N and preferably in the range 20-90 N for a service disconnect switch and 5-50 N per breaker pole. Some housings provide a mechanical means to assist with disassembly from the panel, such as a cam, a screw, a lever, etc. that overcomes the magnetic attraction to the panel. Some such housings comprise one or a plurality of mounting tabs that slide into the slot between a breaker or switch and its slot in a switch housing. In embodiments these tabs are disposed on the sides of the slots perpendicular to the switch-lever motion, thin enough to fit into the narrow slots, and strong enough to resist the switch actuation force. Some embodiments of finger comprise anti-corrosion plated or painted steel of 0.1-2 mm thickness and widths that substantially match the switch height, e.g. 2-50 mm that extends 0.1-5 mm into the slot. In some embodiments these mounting tabs further comprise a curvature or fold that resists motion of the tab from the slot. In some embodiments, one or more of these mounting tabs is spring or flexure loaded and installation into the slot may involve manually overcoming flexure forces over a bump, then continuing to a flexure or spring-loaded detent. Installation in some embodiments may involve pressing a button that compresses a spring or provides temporary flexure to allow insertion. Some embodiments provide a mechanical locking mechanism after insertion into the slot that positively locks the tabs to the slot. Such a mechanism may comprise a screw, lever, plastically deformed, or geometrically or topologically changed assembly of a part of parts. Some embodiments of mounting tabs are disposed to be factory or field installed to accommodate different families of panels and breakers. Embodiments provide for stable mounting without modification of the existing panel.

Some housing embodiments further comprise a connector to one or more of: an external controller, battery, motor, solenoid, ratchet, gear train, worm gear, lead screw, finger guide, limit switch, detent, indicator, pushbutton, resistor, capacitor, transistor, MOSFET, half-bridge, full bridge, gate driver, inductor, voltage regulator, charge controller, microcontroller, wireless module, antenna, coaxial cable. As used herein, a wireless module is any uni- or bi-directional communications link that does not require a wired connection, e.g., Bluetooth, BLE, zigbee, wifi, cellular, near-field, RFID, etc.

Some embodiments of actuators further comprise a means of passing at least one conductor between the interior and exterior of a panel herein called a 'panel feedthrough.' In some embodiments, a panel feedthrough is mounted in an unused breaker or switch position. In some embodiments the panel feedthrough is installed in part by inserting a feedthrough cover containing at least one conductor in a hole in the panel, such as a breaker knock-out. In some embodiments the feedthrough cover snaps over the sheet metal of the panel and is mechanically held in place by one or more of a pawl, mechanical flexure, tab, tooth, etc., as known in the art.

Some embodiments of actuators further comprise one or more means of passing a radio frequency signal from the interior of a panel to the exterior, herein called an 'RF feedthrough.' In some embodiments this RF feedthrough comprises passing one or more of: a coaxial cable, antenna, wireless module, conductor, mount, through a hole in the panel enclosure, e.g., a knockout hole. In some embodiments, the RF feedthrough is held in place by a nut in a manner similar to common knock-out connectors. In some embodiments, the feedthrough is held in place by a pawl, mechanical flexure, tab, tooth, thread, etc. as known in the art. In some embodiments the feedthrough further comprises a water-tight or resistant seal comprising one or more of: a gasket, o-ring, weather stripping, gel, grease, glue. In some embodiments, a thin slot antenna is connected at an open seam, slot-like gap in the panel, knock-out, interface between two sheet metal surfaces, interface between a panel door and housing, opening in a panel as known in the art. In some embodiments, the mechanical connection is made by one or more of adhesion, glue, magnetic force, a mechanical fastener, friction, mechanical preload, e.g., between two metal pieces, such as an enclosure and panel. In some embodiments, the RF feedthrough is a thin slot antenna positioned between a panel door and panel. In some such embodiments, the slot antenna assembly is thin enough not to interfere with the door closure. In some embodiments, an RF cable passes to an antenna in the space between a panel door and panel. In some embodiments, an RF cable passes through the space between a panel enclosure and front panel.

Some embodiments of actuators further comprise a sensor, sensitive to one or more of: a voltage, a voltage difference, an AC voltage, an AC voltage difference, a current, an induced magnetic field, an electrostatic field, an electromagnetic field, temperature. Some embodiments of actuators comprise a capacitive connection to one or more AC circuits.

Some embodiments of sensor capacitors comprise an electrical conductor connected to a conductive sensor surface near a bus bar or wire. Some embodiments of sensor surfaces further comprise an insulating spacer. In some embodiments the insulator has a dielectric constant substantially greater than 1. Some embodiments of insulators may be compliant. Some conductive or insulative sensor surfaces further comprise an adhesive disposed to hold the sensor in place.

Some embodiments of sensors comprise a magnet and one or more of an insulator, conductor, resistor, capacitor, resistive divider. In some embodiments, a sensor is magnetically connected to a ferromagnetic piece of hardware, e.g., screw, nut, bolt, etc., in electrical communication with an AC or DC circuit.

In some embodiments a microcontroller in the actuator takes a measurement using a sensor. In some embodiments, the measurement is one or more of: voltage, current, frequency, AC rms voltage, AC rms current, phase, zero-voltage crossing time. In some embodiments, a microcontroller may be used to compare a measurement with a specification. In some embodiments, this comparison may be used all or in part to determine when to actuate a disconnection or connection. In some embodiments, results of this comparison may be reported to an external system or microcontroller, e.g., via a wired or wireless communication channel.

Actuator and Feedback

Some switch actuators according to embodiments of the present invention comprise an electric motor such as a DC motor, brushless DC motor, AC motor, variable reluctance motor, synchronous motor, universal motor, stepper motor, etc. coupled to a linear or rotary translator that moves the actuator fingers. Because of the high peak actuation forces required, e.g., 30-90 N at the end of a typical service disconnect switch lever, a force amplification stage or sequence of force-amplification stages may be employed including one or more of planetary gear reduction stage, a standard gear reduction stage, a worm gear, a lead screw, a lever. Some actuator stages further comprise position feedback via one or more of: a limit switch, a linear potentiometer, a rotary potentiometer, pulse counting, an encoder, an opto-interrupter, a hall-effect device. Some actuator stages provide discrete position indications, comprising one or more of end-of-travel, home, operate, center, and constant increment. Some actuator stages detect position via sensing motor current. Some actuator stages provide position feedback for discrete positions via one or more mechanical detent which produces a signature motor current waveform near the detent position. Using a current-feedback approach may have the advantage of mimicking force feedback, which may provide additional confirmation of actuation to the actuator by comparing the current history during an actuation to an expected profile. Because the actuation of breakers may be typically direction dependent, the current or force history on actuation can be used to detect the orientation of the breaker lever with respect to the actuator.

In some embodiments, the current or force history may be used to detect when a breaker is in its tripped position. In some embodiments, a breaker state may be tested without a complete actuation by sensing the lever position and resistance to motion via driving the fingers partway, but not far enough to switch the lever. In some embodiments, this sensing may be used provide remote notice of a breaker tripping.

Some alternative actuator embodiments employ a solenoid and ratchet mechanism.

Non-volatile Actuator Settings

Some embodiments of the present invention allow prohibition functions of an actuator to be set via non-volatile electrical settings. Some embodiments of actuator controllers have additional control settings comprising one or more of: dead-man's switch or watch-dog-timer operation in which failure to receive a signal in a programmable time will result in a programmable action, programmable time delays, programmable retry intervals for reclosing breakers, programmable interlocking wherein at least one actuator state is or a command to move to an actuator state is enabled or disabled by another condition, such as the state of a second actuator or switch, a programmable time-of-day switch timer, a programmable circuit priority, a descriptive name for the breaker, a serial number, a panel-slot number, an electronic address, relay or circuit ampacity, security certificate, encryption code, authorization table, switch position locations, etc.

An objective of the present invention is to allow common actuator hardware to mount and actuate properly with minimal or no customization for different switch or panel hardware.

To accommodate different types of switches and circuit breakers, which may generally have different actuation force requirements, a step during installation may comprise actuating a switch in one or more directions while saving current or force measurement data and processing the measurement history into motion parameters saved in non-volatile memory. In some embodiments, these motion parameters may be used to detect the state of a switch or breaker non-intrusively. In some embodiments, these motion parameters may be used to reduce stress on an actuator motor or its gear mechanism.

The height of a switch or circuit breaker over a panel may vary from one manufacturer to another. In some embodiments installation may follow one or more of the following steps:
1) Place a magnetically held mounting and reaction plate onto a panel surface in a position where tabs slide into the gap between the panel and a switch or breaker.
2) Connect an actuator mechanism and housing to the reaction plate via a mechanical fastener as known in the art, wherein the fastener and mechanical design of the reaction plate and housing permit a stand-off height adjustment.

In some alternative embodiments, the mounting and reaction plate may be combined with a housing when placed on a panel and the actuator height adjusted by pressing on the housing while at least one mounting feature ratchets down another mounting feature in a manner similar to that of a 'zip tie.' In some embodiments, the actuator height is adjusted by turning a screw, bolt, cam, or other mechanism known in the art.

Ganged Actuators

Some housing embodiments comprise a plurality of mounting tabs and individually controlled actuators such that a plurality of actuators can be installed at substantially the same time. Some alternative housings for ganged actuators comprise a gang housing into which separately housed actuator assemblies are inserted. Some embodiments of a ganged housing comprise a high-level controller having a wired or wireless or panel-based control interface, further comprising one or more of a wired communications bus, a battery, a charge controller, an AC connection, a communication bus, a digital hand-shaking line, a visual indicator, a capacitor, a transient voltage suppressor, a MOV, a temperature sensor.

In some embodiments, a ganged housing is first installed magnetically onto a panel. In some embodiments, mounting tabs are disposed on the ganged housing. In some embodiments a digital communication connection is established with a microcontroller in the ganged housing. In some embodiments, an actuator assembly is installed into the ganged housing, making electrical contact with a wired connection to the microcontroller. In some embodiments, the microcontroller detects the presence of a new actuator on its bus by measurement, e.g., of a current or analog or digital voltage, or polling of a non-configured address. Upon detecting the new actuator, the microcontroller assigns the actuator a non-volatile address. In some embodiments, the microcontroller may automatically detect the slot location of the actuator and update this information in the actuator non-volatile memory. The microcontroller sets non-volatile parameters of the switch via instructions from an external digital wireless or wired connection to a device such as a cell-phone or computer running a configuration application.

In some embodiments, power is drawn from an AC line, e.g., a separately installed breaker on a panel. In some embodiments this power is used to maintain a state of charge of a battery. In some embodiments, this power is used to actuate a switch motor. In some embodiments, the battery power is used to actuate switches and supply uninterrupted power to a controller. In some embodiments, AC power is supplied from a circuit in the panel that has uninterruptable or briefly interruptible backup power.

Automatic Transfer Switch

A switch actuator according to the present invention, on a panel service disconnect relay or switch may be a component of an automatic transfer switch. When it is time to actuate the transfer switch, this switch may receive a secure wireless command from an external controller to open the service switch. The actuator then performs the opening procedure and when the switch opening is confirmed by position or impedance measurements, the switch actuator transmits a secure acknowledgement or responds to a poll with an indication that the switch is open. Then the external controller can engage a secondary power source. In some embodiments the power source is an inverter.

In some embodiments, a controller associated with the switch actuator can sense the voltage and frequency of an AC power line. In some embodiments the switch actuator can sense the current waveform of an AC power line. In some embodiments, the switch actuator can further sense current or voltage or both in a neutral line. In some embodiments the switch actuator can sense the voltage on the grid side of the switch. In some embodiments the switch actuator can sense the voltage on the non-grid side of the switch. This sensing can be performed by one or more of: electrostatic, inductive, magnetic, direct coupling, coupling through a resistor, capacitor, or inductor. A controller may be configured to monitor the grid-side AC waveform. It may report these parameters on polling or may pro-actively transmit commands or alarms to external devices when it detects an excursion past one or more limits. In some embodiments, the reactive power drawn or delivered to the grid may be quantified and subject to polling or proactive commands.

It may be desirable to detect when the grid has been restored to normal after a service switch is opened. However, the inverter circuitry that normally senses the grid may, in that state, be disconnected from the grid and unable to sense the AC waveform. In some embodiments, the inverter may periodically stop producing power, command the transfer switch to close, assess the status of the grid, and take appropriate action. This may have the disadvantage of producing periodic blackouts. To avoid these blackouts, some embodiments incorporate the service switch and grid-side sensing circuitry in the inverter housing. Some embodiments, comprise a wired sensing line from the inverter housing to an external grid-connected circuit. Some embodiments comprise a wired sensing line to a secondary housing.

In some embodiments, the secondary housing further comprises a service disconnect switch. Some embodiments comprise a wireless data connection to an external grid-connected sensing and reporting circuit.

In some embodiments, a controller within the hybrid inverter system communicates with a smart meter through a wireless, wired, or digital hand-shaking channel. Over this channel, it may read the grid status. In some embodiments, it may read additional information including one or more of: AC voltage, AC current, AC phase, AC frequency, grid operator directives. In some embodiments this microcontroller may translate and relay information from the smart meter to a remote microcontroller. In embodiments, this controller, herein called a 'communications relay controller' is physically close to a smart meter for reliable communications. In some embodiments, the 'communications relay controller' is housed with a switch actuator. In some embodiments this switch actuator actuates a service switch directly or through a wired communication link. In some embodiments, this 'communications relay controller' is located within an inverter housing. In some embodiments, the 'communications relay controller' provides grid-status information needed to decide when to reconnect the service switch.

Some embodiments of systems having sufficiently low sensing latency may use instantaneous measurements of the grid to synchronize the inverter back to the grid when the grid returns. This may be achieved by slewing a clock frequency so that the waveform phase mismatch is nulled. This slewing may be performed by adjusting an RC-timer calibration programmatically. This adjustment may be gradual through a control loop such as a PID or other feedback loop known in the art. The frequency adjustment may further comprise a periodic dither to achieve high frequency resolution. This frequency adjustment control loop may run continuously while connected to the grid. In some embodiments, the instant of zero-crossing of the grid voltage is compared to a digital timer as a high-resolution relative-phase measurement. In some embodiments, A/D conversions, with or without interpolation or cross-correlation is used to calculate a high-resolution relative phase measurement. In some embodiments, both synchronization techniques are employed as cross-checks. It may be advantageous to suppress false relative-phase measurements arising from momentary voltage or current spike, noise, inverter-currents and the like. Some embodiments employ trigger gating over windowed intervals to ignore zero crossings from outlying transients. Some embodiments employ limits on slew-rates of a timing control system so individual outlying zero crossings have a negligible overall effect.

In some embodiments the high-resolution phase information is transmitted over a wireless, time-synchronous signal or data packet. In some embodiments, this data packet comprises one or more of: a packet latency measurement, an rms, peak, or instantaneous voltage measurement. In some embodiments this wireless signal is detected at a microcontroller with low latency. In some embodiments the microcontroller controls the phase of the inverter output. In some embodiments, the transmitted latency is used to correct communication delays when calculating or driving the inverter-generated-waveform phase.

Disconnect from Grid Procedure

As used herein, 'load side' is the circuit disconnected from service in a service disconnect switch and 'grid side' is the circuit maintaining a connection to a power grid or other substantial power source in a service disconnect switch.

As used herein 'pre-disconnection programs and procedures' refer to one or more of: starting or changing the state of a computer program, sending an electronic message, opening a smart load switch, opening a smart breaker, opening an actuated switch, sequentially de-energizing circuits, deenergizing circuits according to a priority based on the available solar and battery power.

In some embodiments of the present invention the inverter system will automatically disconnect from the grid if it detects that the grid is outside set parameters, herein called a 'bad grid state.'

In some embodiments, the disconnection procedure follows the sequence: 1) one or more of: a communications relay controller detects a bad grid state and relays that information remotely to the inverter; a microcontroller senses a bad grid state and relays that information remotely to the inverter; a microcontroller housed in the inverter detects a bad grid state; 2) pre-disconnection programs and procedures are initiated; 3) an autotransformer circuit is connected to the load side circuit; 4) the inverter switches to a disconnection-operating mode; 5) an actuator opens the service switch; 6) the inverter switches to a voltage-feedback or combination voltage and current feedback operating mode.

In some embodiments the ordering of 2 and 3 are swapped. In some embodiments the disconnection-operating mode comprises turning off its output. In some embodiments the disconnection operating mode comprises transitioning from current-feedback to voltage feedback abruptly or gradually. It may be advantageous to connect the autotransformer before opening the service disconnect to mitigate overvoltages and imbalance current running through a grounding circuit.

Return to Grid Procedure

As used herein 'post-reconnection programs and procedures' refer to one or more of: starting or changing the state of a computer program, sending an electronic message, closing a smart load switch, closing a smart breaker, closing an actuated switch, sequentially energizing circuits.

In some embodiments the reconnection of a system to the grid follows the sequence: 1) one or more of: a communications relay controller detects a good grid state and relays that information to the inverter; a microcontroller senses a good grid state and relays that information remotely to the inverter; a microcontroller housed in the inverter detects a good grid state; 2) the inverter powers down its output, producing a momentary 'black out.' 3) an actuator closes the service switch, restoring power 4) an actuator switch removes an autotransformer from the ac circuit lines. In some embodiments having a split-phase inverter, there is no need for an autotransformer and step 4 is skipped. 5) 'Post-reconnection procedures and programs' are initiated.

In some embodiments, the reconnection sequence is 1) the inverter synchronizes its phase and, in some embodiments, voltage based on one or more of: high-time-resolution measurements of the AC grid, an externally generated wireless synchronization signal, a wired synchronization signal, a time synchronized wireless data packet; 2) an actuator closes the service switch; if present, 3) an actuator removes an autotransformer from the ac circuit lines.

Inverter and Balancer Connections

As used herein, 'power module' comprises the packaged electronics associated with one or more of: a Balancer optimizer, an inverter, a battery module, a capacitor module, a charge controller. As used herein, a 'wire-terminal connector' comprises one or more mechanical and electrical components by which one or more wires are separately breakably connected to a power module.

In some embodiments of the present invention, a Balancer optimizer stage is employed wherein one or more bypass cables connect between the Balancer unit and the normal string connections each via a 'Y' or 'T' connector inserted between the normal solar panel power connectors in a string. In some embodiments of the present invention these bypass cables are bundled and routed to an enclosure. In some embodiments the bundle further comprises the main string cables at the voltage extrema of one or more strings.

In some embodiments, each bypass cable is connected to a terminal that is mechanically coupled to a common insulator and electrically coupled to a breakable connector terminal. In some embodiments, the electrical connection is mechanical, e.g., via a spring, screw, lever, crimp as known in the art. In some embodiments the electrical connection is via a weld, solder, conductive glue joint. Some embodiments comprise a terminal block as known in the art. In some embodiments, this terminal block may further provide one or more of AC connections, interlock connections, digital signaling connections, analog signaling connections, handshaking connections, switch state indicators, connections to indicators, such as LEDs, a plurality of connection geometries or connectors, a circuit having a physical offset that delays or advances its time of connection relative to another circuit, a circuit having a resistive lead-in that may reduce in-rush currents, a voltage surge suppression circuit such as a transient voltage suppressor, avalanche device, metal oxide varistor, and the like, a flexible conductor element, mounting hardware and accommodation, a magnet, a ferromagnetic material, an articulated mount, a spring, a mechanical contact to a cam actuator, a mechanical contact to a lever actuator, a motor, a solenoid, an arc-suppression insulator, a conductive bus bar, a plurality of spring-loaded electrodes.

In some embodiments, a plurality of DC connections may be substantially simultaneously opened, by a translational or rotational motion. In some embodiments, this motion may actuate a breakable connection to the power module. In some embodiments, the terminal block or wire connection and breakable connection move together. In some embodiments, the motion of the breakable connection and wire connection are isolated through a flexible conductor. Some embodiments maintain a closed connector state by one or more of: magnetic force, mechanical force e.g., against a lever, ratchet, cam, latch, friction force, gravity force. Some embodiments comprise a mechanical preload that rapidly opens the connector a distance substantial enough to extinguish an electrical arc. This mechanical preload may comprise one or more of a spring, torsional spring, leaf spring, coil spring, flexible element, mass. Some embodiments further comprise an arc-suppression element that deploys on the opening of the connector. This element may be an insulator, resistor, conductor, or semiconductor.

The wire-terminal connector assembly may comprise a position in which one or more bypass and string wires are short-circuited by a conductor. In some embodiments, this short-circuiting conductor comprises a second breakable connection to a mating connector with internal or external conductors comprising the short circuitry. In some embodiments, all or a part of the wire-terminal assembly may move to a position when a plurality of conductors come into contact with a plurality of electrically conductive points having a common conduction path. In some embodiments, these points are electrical contacts having a spring or flexible loading. In some embodiments, these points are the surface of a conductive bus bar. In some embodiments, the mating contacts in the wire-terminal assembly have a spring or flexible loading. In some embodiments, the closure of the short circuits effects a voltage-suppression function or 'rapid shutdown.' In some embodiments, the physical arrangement of conductors staggers the short-circuit time. In some embodiments, at least one resistive element makes first contact to reduce switching transients.

In some embodiments, the redundancy of connections from the bypass cables confers additional surety against the presence of unwanted voltages via redundancy. E.g., if a connection fails between the panels or anywhere in the circuit, the redundant short-circuit connections limit the maximum possible voltage during shut-down substantially to a single-panel open-circuit voltage.

In some embodiments, the actuation of the wire-terminal connection is controlled via one or more of: a rotary knob, a linear knob, a plurality of knobs, a cam, a lever, a mechanical linkage, a motor, a solenoid, a control circuit. In some embodiments, a single knob may have a separate 'connect,' 'disconnect,' and 'shut-down' position. In some embodiments these positions correspond to mechanical detents in a cam, lever, or linkage. In some embodiments, a switch knob rotates in only one direction. In some embodiments, a mechanical contact does one or more of: translate along a ramp, directly or indirectly increase the strain energy of a spring or flexure, drop down an abrupt change, e.g., a tooth or ratchet in a rotary or linear cog mechanism, releasing strain energy, drop into a detent position.

In some embodiments, circuitry in the power module can sense or be communicated information about the actuation of the wire-terminal array before a power circuit opens or closes via one or more of: a separately disposed circuit, a magnetic switch, a mechanical coupling to a switch, or other position-sensing or communications circuit known in the art. In some embodiments, the circuitry uses this advance notice to change an operating mode. In some embodiments, the circuitry does one or more of: turns off a power switching circuit, stops battery charging, stops battery discharging, stops drawing bypass current from a panel, stops supplying AC current, closes a switch to draw maximum current from a panel.

Some embodiments of wire-terminal connectors have one or more wire terminals whose connections may be broken separately from others. Some such connections may be AC connections, switch-position indicator connections, signaling connections, uninterruptable power connections, sensing connections.

Some embodiments of wire-terminal connections have one or more wire terminals whose connections are broken by removing the power module from the mating connector.

Some embodiments of hardware associated with the wire-terminal connector or its enclosing housing comprise one or more latch to secure a connector. Some embodiments of such a latch further comprise a mechanical or electrical position indicator. In some embodiments, such an indicator is used as a safety interlock. In some embodiments such an indicator switches a mode of operation of the power module.

Thermal Management

Some embodiments of power modules according to the present invention comprise a design architecture herein called a 'cooling fin body,' wherein the housing is one or more bent sheet or thin extrusion of metal having a slender aspect such that thermal diffusion length from a heat source to an exterior surface through the interior is substantially dominated by the component dimensions and where both sides of the cooling fin body transfer a substantial quantity of heat to the air or heat-transfer fluid. Cooling fin body designs do not overly restrict or impede forced or natural convective heat transfer.

Cooling fin bodies in accordance with embodiments of the present invention are substantially in intimate thermal contact with significant heat producers such as switches, diodes, inductors, electrolytic capacitors, resistors, snubber networks, power supplies, batteries, logic circuitry, fuses, breakers, etc. This intimate contact may be made through one or more of: mechanical preload, direct contact, monolithic material, heat-spreader, heat pipe, thermally conductive gel, foam, paste, epoxy, glue, filled polymer, metal. Some embodiments of heat generators, e.g., inductors may be disposed through a hole in a printed circuit board such that flat surfaces of its bobbin are in intimate contact with both sides of the cooling fin housing. Some embodiments sandwich substantially cylindrical heat generating components such as batteries and electrolytic capacitors such that the components have intimate thermal contact with the cooling fin housing along two tangent lines. In some such embodiments, an intermediary material having a high thermal conductivity may be interposed to enhance heat transfer from the non-tangent sides of the cylinder. In some embodiments, the shape of the cooling fin housing may conform to the shape of the internal bodies to generate an expanded area in intimate thermal contact for enhanced cooling and, in some cases, increased wetted area. In some embodiments of the present invention a part of the cooling fin housing may be cast or molded. In some embodiments a cooling fin housing component may be cast, molded or conformally coated around one or more components. Some embodiments of cooling fin bodies further comprise features such as secondary fins disposed in the cooling fluid to increase the wetted area. Some embodiments of cooling fin housings comprise a material thickness sufficient to spread heat along the surface of the cooling body. In embodiments, the circuitry housed in a cooling-fin body may have a 'controlling dimension' that sets a substantially uniform fin outside thickness. In some embodiments, this thickness is 5-50 mm, and preferably 10-30 mm. An advantage of a smaller outside thickness may be reduced thermal diffusion length, while an advantage of a larger outside thickness may be increased stiffness or mechanical strength. Some embodiments of the present invention substantially employ a battery/capacitor/ and inductor controlling dimension of 12-25 mm.

Capacitor Module

Some electrolytic capacitors in accordance with the present invention are disposed in removable modular arrays. Some such modules comprise a plurality of parallel and series-connected capacitors further comprising a distributed or multi contact breakable connection to a printed circuit board or mating connector.

Some embodiments of capacitor modules further comprise a charge-bleed resistor such that dangerous voltages are drained rapidly when a module is removed from equipment, but the resistor is disconnected when the module is inserted. Some embodiments drain the capacitor module in 1 ms-10 s and preferably 50 ms-2 s. Some embodiments employ a conductive elastomer, rendered conductive via a fill material such as carbon, graphite, silver particles, etc. or via a conductive polymer backbone, to comprise this resistor. Some embodiments use the same resistor to limit the rate of charge of capacitors on insertion by disposing the resistor such that the capacitor module first connects to power through the resistor, then when fully inserted, through a plurality of low-resistance contacts.

Embodiments of capacitor modules distribute capacitors in a single wide layer so heat can be transferred efficiently from both sides of a cooling-fin-body housing. Embodiments of contacts provide a low-inductance charge path across a wide module opening. Some such electrode embodiments comprise spring loaded conductors similar to that known in the art as 'finger stock.' Materials may include copper, beryllium copper, or high-conductance plated steels in the thickness range of 0.025-2 mm, preferably 0.1-0.5 mm. Some embodiments further comprise a corrosion resistant coating such as nickel or gold as known in the art.

Figure 9A:
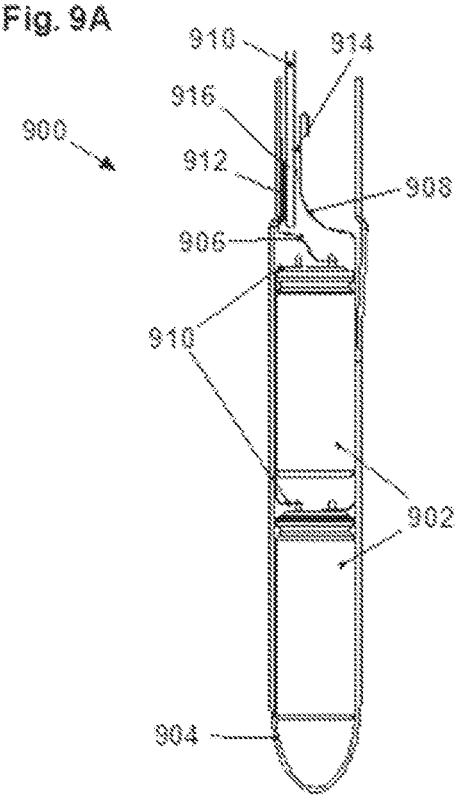
FIG. 9A shows a side view of a capacitor module according to various embodiments.
Figure 9B:
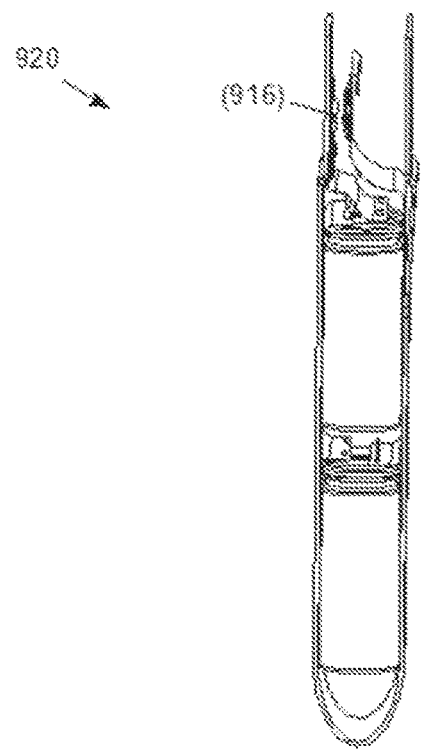
FIG. 9B shows an offset view of the capacitor module according to various embodiments.

FIGS. 9A and 9B respectively show a side (900) and offset (920) view of a two-bank-wide section of an arrayed bank of 2-series-connected capacitors in a capacitor module embodiment in an attached configuration, wherein the capacitor module is making electrical contact with a circuit board in a power module. Capacitor modules according to embodiments of the present invention may comprise arrays that are more than two banks wide, with embodiments being in the range 2 to 64, increasing with the required capacity of the inverter. Some embodiments comprise additional capacitors in series as known in the art to effect a higher voltage holdoff. Insulators and some structural elements are not shown for clarity.

Elements 902 are electrolytic capacitors and element 904 is a thermally conductive housing. An objective of this design is to maximize heat transfer per unit of housing material from the electrolytic capacitors. In some embodiments, the housing further comprises indentations to better conform to the shape of the electrolytic capacitor for better thermal contact and increased wetted area for better heat transfer to ambient.

Elements 906, 907, and 908 are sheet conductors disposed to minimize inductance. These conductors may be isolated between one or more banks of capacitors within the module or common to all capacitor banks within the module. Element 910 is a circuit board of the power module inserted between 'finger-stock' electrodes 912 and 914. When inserted, a conductive pad on one side of the printed circuit board first makes contact with resistive electrode 916, which may comprise a filled or conductive elastomer. This forms an electrical connection that may gently allow charge redistribution between modules. As circuit board 910 is inserted completely to the position shown in 900, contacts on opposite sides make compressive contact with the high-conductivity finger stock electrodes. For clarity the board 910 is not shown in the view 920.

Figure 9C:
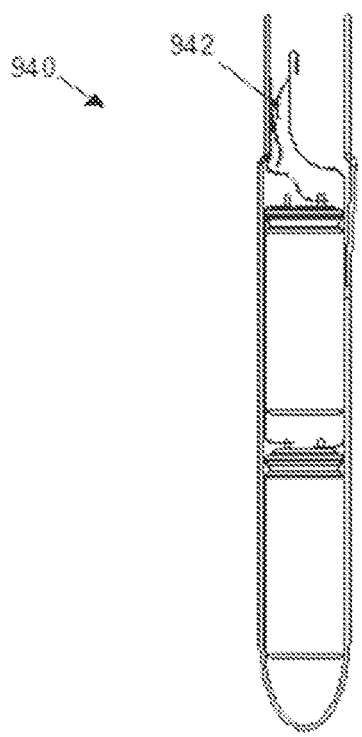
FIG. 9C shows a side view of a capacitor module in a detached configured according to various embodiments.
Figure 9D:
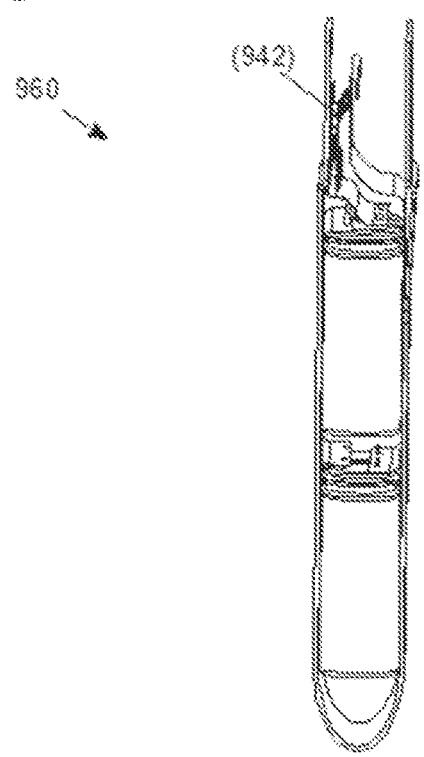
FIG. 9D shows an offset view of the capacitor module in the detached configuration according to various embodiments.

FIGS. 9C and 9D respectively show a side (940) and slightly offset (960) view of a capacitor module embodiment in a detached configuration, wherein the printed circuit board 910 is not compressing the finger stock 914 and 912. As a result, the electrodes flexure relaxes and 914 makes contact with resistive electrode 916 at location 942. In this state, energy within the capacitor module may be discharged in a controlled, low-mechanical and electrical stress manner. Some embodiments of electrodes 916 are design such that the automatic discharge time after a capacitor module is removed is of the order of seconds or less so that a person removing the module is not exposed to stored energy or high voltage.

Stationary Assembly

Some embodiments of the present invention comprise a cooling-fin-body power module that is removably connected to an enclosure that is substantially permanently installed herein called the 'stationary assembly'. The stationary assembly comprises an enclosure and mounting hardware and one or more openings to cables and cable conduits. The stationary assembly may substantially comprise long-life and low-maintenance componentry, conventional electrical wiring, breakers, switches, antennas, and the like. Some stationary assemblies may further contain technician replaceable components such as fuses, metal oxide varistors and the like. Some embodiments of stationary assemblies may further house an autotransformer. Some embodiments may further comprise an automated autotransformer connection switch. Some embodiments of stationary assemblies comprise a feature such as a pipe or opening in the back so that electrical cables including one or more of: DC string cables, bypass cables, AC cables, communications cables can be neatly routed down the back side of the enclosure. Some embodiments of stationary assemblies provide an opening on the bottom side through which cables may pass into the interior of the stationary assembly. Some such assemblies provide a cowling or cover to protect and make the cable entry aesthetic. The interior of the stationary assembly may comprise one or more wire-terminal connectors as described herein. Some such assemblies provide an opening or protrusion to allow one or more power module mating connectors to plug in.

Some embodiments comprise a connector disposed on one vertical side of a stationary assembly some embodiments comprise two connectors disposed on opposite sides of a stationary assembly. Some embodiments comprise more than one connector arrayed on one or two sides so that installed power modules are arrayed like large parallel cooling fins, with a spacing between 1 and 50 times the cooling fin body thickness and preferably between 2 and 10 times this thickness.

Some comprise at least one mechanical latch to hold a power module in place. Some comprise at least one conventional mechanical fastener, such as a screw or bolt to hold a power module in place.

Some embodiments further comprise a mechanical shield outside the envelope of a power module or modules. Some embodiments of shields protect a power module from damage, e.g., from impact. Some embodiments protect against thermal burns, some shade a power module from direct sunlight. Some shields are cosmetic and aesthetic.

Islanding Converter

Some embodiments of the present invention comprise a voltage-source inverter stage, herein an inverter stage that employs feedback substantially to maintain a voltage waveform, that may be energized when the grid voltage is outside frequency or voltage specifications or when the grid is disconnected. In some embodiments, the inverter feedback may be switched from a substantially current-feedback mode to a substantially voltage-feedback mode, a mode comprising feedback derived from a combination voltage signal and its derivatives and integrals, a mode comprising feedback derived from a combination current signal and its derivatives and integrals, a mode comprising a combination of the previous modes. In some embodiments, this switching is performed by one or more of: an analog switch, a tristate-able I/O line, a transistor circuit, an op-amp circuit, microcontroller firmware, changing weighting variables in firmware, changing algorithms in firmware, changing subroutines in firmware as known in the art.

In some embodiments the inverter stage may operate to feed a grid signal to a second inverter that is within the second inverter operating limits. In some embodiments this provides for a second inverter to be operated to increase the power output of a system in a master-slave arrangement wherein the first inverter is the master and the second inverter is the slave as known in the art. Some embodiments comprise a plurality of slave inverters. Some embodiments may further comprise an inertial load/generator such as a flywheel to resist rapid voltage variations from current transients and surges. Some embodiments energize a flywheel only when supplying power during an outage.

Some embodiments of circuits controlling the discharge of batteries may control the output power to vary slow enough not to interfere with a maximum power-point tracking algorithm. In some embodiments the controller detects a voltage, current, or combination waveform associated with a power-point optimization sequence initiated by an inverter and maintains a substantially constant power discharge during this interval. In some embodiments, the Balancer and battery charge-discharge circuit feeds an external (non-integrated) inverter.

EXAMPLES

In the following sections, further exemplary embodiments are provided.

Example 1 may include an inverter system comprising a battery module, a solar panel, and a battery charge control circuitry coupled to the battery module and the solar panel, the battery charge control circuitry to control a rate of discharge of the battery module to be applied to the solar panel and to cause the battery module to be charged.

Example 2 may include the inverter system of example 1, wherein the battery charge control circuitry includes a first switch coupled to a buck converter, the first switch to control the rate of discharge of the battery module, and a second switch coupled to boost circuit, the second switch to cause the battery module to be charged.

Example 3 may include the inverter system of example 1, wherein the battery charge control circuitry includes bus circuitry coupled to the battery module and the solar panel, and an optimizer coupled to the bus circuitry, the optimizer to draw power from the bus circuitry and provide power to a load.

Example 4 may include the inverter system of example 3, wherein the load comprises an inverter.

Example 5 may include the inverter system of example 1, wherein the solar panel is a first solar panel, wherein the inverter system further comprises a second solar panel coupled in series with the first solar panel, and wherein a bypass cable couples the battery charge control circuitry between the first solar panel and the second solar panel.

Example 6 may include the inverter system of example 1, further comprising an inverter coupled to the battery charge control circuitry, wherein the inverter is switchable between current-feedback and substantially voltage-feedback control.

Example 7 may include an inverter system, comprising a stationary unit, a detachable power module coupled to the stationary unit, a detachable capacitor module coupled to the detachable power module, and one or more detachable battery modules coupled to the detachable power module.

Example 8 may include the inverter system of example 7, wherein the detachable power module is housed in a cooling-fin geometry, wherein heat-generating devices of the detachable power module are in intimate thermal contact with interior-facing sides of two thermally conductive sheets disposed on opposite sides of the heat-generating devices, and wherein exterior-facings sides of the two thermally conductive sheets are disposed to facilitate heat transfer to a fluid.

Example 9 may include the inverter system of example 8, wherein the fluid is naturally convecting air, and wherein the two thermally conductive sheets are disposed with a substantially vertical exterior surface plane.

Example 10 may include a battery module comprising an array of batteries, the array of batteries being singly stacked, and a battery charge board coupled to the array of batteries by one or more connections, the battery charge board having one or more cell bypass circuits to bypass one or more cells of the array of batteries when the one or more cells reach a full-charge state.

Example 11 may include the battery module of example 10, wherein each battery within the array of batteries includes an AC-coupled connection to a common full-discharge indicator line.

Example 12 may include the battery module of example 10, the battery module further comprises auxiliary connections to couple to battery charge control circuitry, wherein the battery module is to be physically separated from the battery charge control circuitry by a corrugated isolator.

Example 13 may include the battery module of example 12, wherein the battery charge board is to communicate to the battery charge control circuitry one or more of an end of charge, end of discharge, cell type, temperature, charge profile, charge history, state of charge, serial number, date of manufacturing, charge/discharge limits, or cell chemistry of the one or more cells.

Example 14 may include a switch comprising a magnetic attachment for attaching a plate of the switch to a panel surface, one or more fingers for actuation of a throw of the switch, a motor to cause the one or more fingers to actuate the throw to change a state of the switch, a force amplification stage coupled to the motor to amplify an amount of force produced by the motor to cause the one or more fingers to actuate, a motor-current-sensing circuit to sense a current of the motor, and a microcontroller to determine whether to set the switch to a connected state or disconnected state based on the current.

Example 15 may include the switch of example 14, wherein the motor is a gear motor.

Example 16 may include the switch of example 14, wherein the force actuation stage comprises a planetary gear reduction stage, a standard gear reduction stage, a worm gear, or a lead screw.

Example 17 may include the switch of example 14, further comprising a lead screw to be utilized for overcoming a magnetic force of the magnetic attachment to remove the plate from the panel surface.

Example 18 may include the switch of example 14, further comprising a communication module to establish a communication link to a smart meter.

Example 19 may include the switch of example 14, further comprising a capacitively coupled AC waveform voltage sensing circuit, the microcontroller to synchronize actuation of the throw with an AC waveform sensed by the capacitively coupled AC waveform voltage sensing circuit.

Example 20 may include the switch of example 14, wherein the microcontroller is to implement a motion algorithm to infer a state of the switch nonintrusively.

Example 21 may include the switch of example 20, wherein the microcontroller is to cause a finger, of the one or more fingers, to be moved, sense a current associated with movement of the finger, and infer the state of the switch based on comparison of the current with a setting.

Example 22 may include a balancer-based power optimizer further comprising a battery charge controller.

Example 23 may include the power optimizer of claim 22 further comprising a battery module.

Example 24 may include an array of power optimizers of claim 23 at least one of which is connected between two panels by a bypass cable.

Example 25 may include a hybrid inverter system comprising the array of power optimizers of claim 24 and an inverter that is switchable between current-feedback and substantially voltage-feedback control.

Example 26 may include a hybrid inverter system comprising an assembly of a stationary element, a detachable power module, a detachable capacitor module, and at least one detachable battery module.

Example 27 may include a hybrid inverter system according to claim 26 wherein a detachable module is housed in a cooling-fin geometry wherein heat-generating devices are in intimate thermal contact with interior-facing sides of two thermally conductive sheets disposed on opposite sides of the heat-generating devices and wherein the exterior-facing sides of the sheets are disposed to facilitate heat transfer to a fluid.

Example 28 may include the inverter system of claim 27 wherein the fluid is naturally convecting air and the sheets are disposed with a substantially vertical exterior surface plane.

Example 29 may include a battery module comprising a singly stacked array of batteries, each further comprising a connection to a battery management board having an individual cell bypass/charge dump circuit that is activated when a cell reaches a full-charge state, each further comprising an AC-coupled connection to a common full-discharge indicator line.

Example 30 may include an array of battery modules of claim 29, each connected to the power optimizer of claim 22 physically separated by a corrugated isolator.

Example 31 may include an automated switch/breaker controller comprising a gearmotor, leadscrew, finger, magnetic attachment, motor current-sensing circuit, and microcontroller with non-volatile memory.

Example 32 may include an automated switch/breaker controller of claim 31 further comprising a communication link to a Smart Meter.

Example 33 may include an automated switch/breaker controller of claim 31 further comprising a capacitively coupled AC waveform voltage sensing circuit.

Example 34 may include an automated switch/breaker controller of claim 31 further comprising a motion algorithm that moves an actuator finger while sensing current, compares the current to a setting, then uses this comparison to infer the state of a switch/breaker nonintrusively.

What is claimed is:

1. A hybrid inverter system comprising:
    a balancer-based power optimizer including a battery charge controller;
    an array of power optimizers, wherein the balancer-based power optimizer is a first power optimizer and the array of power optimizers includes the first power optimizer, and wherein at least one power optimizer within the array of power optimizers is connected between two panels by a bypass cable; and
    an inverter that is switchable between current-feedback and substantially voltage-feedback control.

2. The hybrid inverter system of claim 1, wherein the balancer-based power optimizer further comprises a battery module.

3. A hybrid inverter system comprising an assembly of a stationary element, a detachable power module, a detachable capacitor module, and at least one detachable battery module.

4. The hybrid inverter system of claim 3, wherein a detachable module is housed in a cooling-fin geometry, wherein heat-generating devices are in intimate thermal contact with interior-facing sides of two thermally conductive sheets disposed on opposite sides of the heat-generating devices, and wherein exterior-facing sides of the two thermally conductive sheets are disposed to facilitate heat transfer to a fluid.

5. The hybrid inverter system of claim 4, wherein the fluid is naturally convecting air and the two thermally conductive sheets are disposed with a substantially vertical exterior surface plane.

\* \* \* \* \*